(12) United States Patent
Lotfallah et al.

(10) Patent No.: US 10,033,777 B2
(45) Date of Patent: Jul. 24, 2018

(54) MULTI-HYPOTHESIS RATE ADAPTATION FOR HTTP STREAMING

(71) Applicant: InterDigital Patent Holdings, Inc., Wilmington, DE (US)

(72) Inventors: Osama Lotfallah, San Diego, CA (US); Hang Liu, North Potomac, MD (US); Yuriy Reznik, Seattle, WA (US); Eduardo Asbun, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 16 days.

(21) Appl. No.: 14/436,480

(22) PCT Filed: Oct. 17, 2013

(86) PCT No.: PCT/US2013/065440
§ 371 (c)(1),
(2) Date: Apr. 16, 2015

(87) PCT Pub. No.: WO2014/062921
PCT Pub. Date: Apr. 24, 2014

(65) Prior Publication Data
US 2016/0050241 A1 Feb. 18, 2016

Related U.S. Application Data

(60) Provisional application No. 61/716,369, filed on Oct. 19, 2012.

(51) Int. Cl.
*G06F 15/16* (2006.01)
*H04L 29/06* (2006.01)
*H04L 29/08* (2006.01)

(52) U.S. Cl.
CPC ...... *H04L 65/4069* (2013.01); *H04L 65/1083* (2013.01); *H04L 65/604* (2013.01);
(Continued)

(58) Field of Classification Search
None
See application file for complete search history.

(56) References Cited

U.S. PATENT DOCUMENTS 8,938,767 B2 * 1/2015 Chen ............... H04N 21/23439
709/231
8,977,704 B2 * 3/2015 Liu ................ H04N 21/23439
709/213
(Continued)

FOREIGN PATENT DOCUMENTS

KR 10-2010-0057622 A 5/2010
WO WO 2011/038021 A1 3/2011
(Continued)

OTHER PUBLICATIONS

Bouazizi et al., "3GPP Mobile Multimedia Services", IEEE Signal Processing Magazine, Sep. 2010, pp. 126-130.
(Continued)

*Primary Examiner* — Joshua Joo
(74) *Attorney, Agent, or Firm* — Condo Roccia Koptiw LLP

(57) ABSTRACT

A multi-hypothesis rate adaptation technique may be performed for one or more wireless multimedia streaming scenarios. Managing a multimedia streaming session may involve sending, by a client, a request for a first portion of content to a server. A response may be received from a proxy. The response may comprise the first portion of content and information associated with a second portion of content available via the proxy. A request may be sent to the proxy for the proxy to deliver the second portion of content to the client. A change in a parameter associated with the multimedia streaming session may be determined based on data received from the proxy. It may be determined to
(Continued)

change a rate adaptation. A Wireless Transmit/Receive Unit (WTRU) may be configured to perform the rate adaptation.

20 Claims, 14 Drawing Sheets

(52) U.S. Cl.
CPC ............ *H04L 65/608* (2013.01); *H04L 65/80* (2013.01); *H04L 67/02* (2013.01); *H04L 67/2804* (2013.01); *H04L 67/2842* (2013.01); *H04L 67/2847* (2013.01)

(56) References Cited

U.S. PATENT DOCUMENTS

| | | | |
|---|---|---|---|
| 9,131,027 B2* | 9/2015 | Zhang ................ | H04L 65/60 |
| 9,549,000 B2* | 1/2017 | Panje ................ | H04L 65/60 |
| 2006/0168295 A1* | 7/2006 | Batterberry ....... | H04L 29/06027 709/231 |
| 2009/0086627 A1* | 4/2009 | Ujjain ................ | H04L 1/0002 370/229 |
| 2011/0225317 A1 | 9/2011 | Balachandran et al. | |
| 2012/0042090 A1* | 2/2012 | Chen ................. | H04L 65/607 709/231 |
| 2012/0090036 A1* | 4/2012 | Kang ................ | G06F 21/10 726/27 |
| 2012/0117261 A1* | 5/2012 | Bouazizi ............ | H04L 65/1069 709/231 |
| 2012/0185570 A1* | 7/2012 | Bouazizi .......... | H04N 21/44016 709/219 |
| 2012/0259994 A1 | 10/2012 | Gillies et al. | |
| 2013/0007814 A1* | 1/2013 | Cherian ............... | H04L 65/605 725/62 |
| 2013/0117413 A1 | 3/2013 | Kaneko et al. | |
| 2013/0159546 A1 | 6/2013 | Thang et al. | |
| 2013/0191511 A1* | 7/2013 | Liu ................... | H04L 67/2847 709/219 |
| 2013/0227102 A1* | 8/2013 | Beck ................. | H04L 65/4084 709/223 |
| 2014/0149557 A1* | 5/2014 | Lohmar ............. | H04L 65/605 709/219 |
| 2016/0255133 A1* | 9/2016 | Nagaraj ............. | H04N 21/4384 709/219 |
| 2016/0323342 A1* | 11/2016 | Luby ................ | H04N 21/23106 |

FOREIGN PATENT DOCUMENTS

| | | |
|---|---|---|
| WO | WO 2011/038321 A2 | 3/2011 |
| WO | WO 2012/011450 A1 | 1/2012 |
| WO | WO 2012/019621 A1 | 2/2012 |
| WO | WO 2012/030178 A2 | 3/2012 |
| WO | WO 2012/138909 A1 | 10/2012 |

OTHER PUBLICATIONS

Choi et al., "A Study on Service Migration in HTML5 based HTTP Streaming Environments", Journal of Korea Multimedia Society, vol. 14, No. 7, Jul. 2011, 13 pages.

Rejaie et al., "Multimedia Proxy Caching Mechanism for Quality Adaptive Streaming Applications in the Internet", IEEE INFOCOM, 2000, pp. 980-989.

3rd Generation Partnership Project(3GPP), TS 26.234 V9.6.0, "Technical Specification Group Services and System Aspects, Transparent End-to-End Packet-Switched Streaming Service (PSS), Protocols and Codecs (Release 9)", Mar. 2011, 189 pages.

3rd Generation Partnership Project(3GPP), TS 26.247 V10.0.0, "Technical Specification Group Services and System Aspects, Transparent End-to-End Packet-Switched Streaming Service (PSS), Progressive Download and Dynamic Adaptive Streaming over HTTP (3GP-DASH) (Release 10)", Jun. 2011, 94 pages.

Adobe, "HTTP Dynamic Streaming on the Adobe® Flash® Platform-Enabling High-Quality, Network-Efficient HTTP Streaming for Media Delivery", Adobe Flash Platform Technical White Paper, 2010, pp. 1-18.

Conklin et al., "Video Coding for Streaming Media Delivery on the Internet", IEEE Transactions on Circuits and Systems for Video Technology, vol. 11, No. 3, Mar. 2001, pp. 269-281.

ISO/IEC, "Information Technology-Coding of Audio-Visual Objects—Part 12: ISO Base Media File Format, Amendment 3: DASH Support and RTP Reception Hint Track Processing", ISO/IEC 14496-12:2008/FDAM 3:2011(E), STD Version 2.1c2, Aug. 17, 2011, 44 pages.

ISO/IEC, "Information Technology-Dynamic Adaptive Streaming over HTTP (DASH)—Part 1: Media Presentation Description and Segment Formats", ISO/IEC 23009-1:2012(E), STD Version 2.1c2, Jan. 5, 2012, 133 pages.

Malvar, Henrique S.,"Signal Processing with Lapped Transforms", Artech House, Jan. 1992, 5 pages.

Open IPTV Forum, "Release 2 Specification-Volume 2a-HTTP Adaptive Streaming", vol. 2.1, Jun. 21, 2011, pp. 1-25.

Pantos et al., "HTTP Live Streaming", draft-pantos-http-live-streaming-06, Apple Inc., Mar. 31, 2011, 25 pages.

Sodagar et al., "Reinventing Multimedia Delivery with MPEG-DASH", Proc. SPIE 8135, Applications of Digital Image Processing XXXIV, 81350R, Sep. 24, 2011, 8 pages.

Stockhammer, Thomas, "Dynamic Adaptive Streaming over HTTP-Standards and Design Principles", Proceedings of the Second Annual ACM Conference on Multimedia Systems New York, NY, USA: ACM Press, Feb. 23-25, 2011, 11 pages.

Wolters et al., "A Closer Look into MPEG-4 High Efficiency AAC", Audio Engineering Society, Convention Paper, Presented at the 115th Convention, Oct. 10-13, 2003, 16 pages.

Zambelli, Alex,"IIS Smooth Streaming Technical Overview", Microsoft Corporation, Mar. 2009, 17 pages.

* cited by examiner

| Access technology | | Typical peak bandwidth |
|---|---|---|
| Wireless | 2.5G | 32 kbps |
| | 3G | 5 Mbps |
| | LTE | 50 Mbps |
| WiFi | 802.11b | 5 Mbps |
| | 802.11g | 54 Mbps |
| | 802.11n | 150 Mbps |
| Internet | Dial-up | 64 kbps |
| | DSL | 3 Mbps |
| | Fiber | 1 Gbps |

FIG. 3

| Device | | Screen resolution |
|---|---|---|
| Smartphones | HTC Desire | 800 x 480 |
| | iPhone | 960 x 640 |
| | Galaxy Nexus | 1280 x 720 |
| Tablets | Galaxy Tab | 1024 x 600 |
| | iPad 1, 2 | 1024 x 768 |
| | iPad 3 | 2048 x 1536 |
| Laptops | Notebook | 1024 x 600 |
| | Mid-range laptop | 1366 x 758 |
| | High-end laptop | 1920 x 1080 |
| HDTVs | 720p | 1280 x 720 |
| | 1080p | 1920 x 1080 |
| | 4K (future) | 4096 x 2160 |

FIG. 4

| Name(s) | | Screen resolution |
|---|---|---|
| 240p | QVGA | 320 x 240 |
| 360p | | 640 x 360 |
| 480p | VGA | 640 x 480 |
| 720p | | 1280 x 720 |
| 1080p | Full HD | 1920 x 1080 |

FIG. 5

| Hypothesis Index | $a_1$ | | $a_2$ | | $a_3$ | | .. | $a_K$ | |
|---|---|---|---|---|---|---|---|---|---|
| 1 | $a_{1,1}$ | $b_{1,1}$ | $a_{2,1}$ | $b_{2,1}$ | $a_{3,1}$ | $b_{3,1}$ | | $a_{K,1}$ | $b_{K,1}$ |
| 2 | $a_{1,2}$ | $b_{1,2}$ | $a_{2,2}$ | $b_{2,2}$ | $a_{3,2}$ | $b_{3,2}$ | | $a_{K,2}$ | $b_{K,2}$ |
| 3 | $a_{1,3}$ | $b_{1,3}$ | $a_{2,3}$ | $b_{2,3}$ | $a_{3,3}$ | $b_{3,3}$ | | $a_{K,3}$ | $b_{K,3}$ |

US 10,033,777 B2

MULTI-HYPOTHESIS RATE ADAPTATION FOR HTTP STREAMING

CROSS-REFERENCE TO RELATED APPLICATION

This application is the National Stage Entry under 35 U.S.C. § 371 of Patent Cooperation Treaty Application No. PCT/US2013/065440, filed Oct. 19, 2012, which claims the benefit of priority to provisional application No. 61/716,369, filed Oct. 19, 2012.

BACKGROUND

Streaming over Hypertext Transfer Protocol (HTTP) has become a popular approach for delivering multimedia content (e.g., audio, video, etc.) over the Internet, for example, to set top boxes, Internet ready televisions, computers, wireless devices, and the like. Multimedia content may be made available at a variety of different bit rates, resolutions, minimum and/or maximum bandwidths, and may be available from multiple sources.

HTTP streaming clients, such as Wireless Transmit/Receive Units (WTRUs), may employ streaming rate adaptation. Such streaming rate adaptation approaches may apply single step or step-wise scale-up/scale down techniques, for example, to maximize a bandwidth utilization ratio. However, such rate adaptation techniques may result in sudden and/or noticeable changes in playback quality that may be objectionable to end users, for instance, end users concerned with one or more of the following: a constant perceived frame rate; minimal noticeable quality variations; consistent clarity of video and/or audio material throughout an entirety of a multimedia streaming session; the ability to access the streaming multimedia content from different devices with minimal interruptions; etc.

Additionally, some streaming rate adaptation approaches may fail to satisfactorily address networking resource sharing among multiple streaming clients and/or the splitting of bandwidth among various streaming media components such as video, audio, timed-text, and/or slides (e.g., presentation slides).

SUMMARY

A multi-hypothesis rate adaptation technique may be performed for one or more wireless multimedia streaming (e.g., video streaming) scenarios.

A method of managing a multimedia streaming session may involve sending, by a client, a request for a first portion of content to a server. A response may be received from a proxy. The response may comprise the first portion of content and information associated with a second portion of content available via the proxy. A request may be sent to the proxy for the proxy to deliver the second portion of content to the client. A change in a characteristic associated with the multimedia streaming session may be determined based on data received from the proxy. It may be determined to change a rate adaptation.

A wireless transmit/receive unit (WTRU) may comprise a processor configured to cause the WTRU to send a request for a first portion of content to a server. On a condition that a response is received from a proxy comprising the first portion of content and information associated with a second portion of content available via the proxy, the processor may cause the WTRU to send a request to the proxy for the proxy to deliver the second portion of content to the WTRU. The processor may be configured to determine a change in a characteristic associated with the multimedia streaming session based on data received from the proxy and to determine to change a rate adaptation.

BRIEF DESCRIPTION OF THE DRAWINGS

FIG. 3 is a table of exemplary peak bandwidths of respective access networks.

FIG. 4 is a table of exemplary screen resolutions of example devices that are capable of multimedia streaming.

FIG. 5 is a table of example standard screen resolutions.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application. In addition, the figures may illustrate one or more message charts, which are meant to be exemplary. Other embodiments may be used. The order of the messages may be varied where appropriate. Messages may be omitted if not needed, and, additional flows may be added.

Rate adaptation may be performed on streaming sessions (e.g., streaming of multimedia content) established over wired and/or wireless networks (e.g., 3G or 4G cellular, WiFi, Internet, etc.), for example, in response to variable bandwidth in an associated communications network. For example, in accordance with adaptive streaming, a rate at which media is streamed to one or more streaming clients may be adapted in accordance with varying network conditions or, for example, to maintain constant video quality. Adaptive streaming may enable one or more streaming clients to correlate respective rates at which streaming media is received by the one or more clients to respective bandwidths available or quality level criteria, to the one or more streaming clients.

Figure 1:
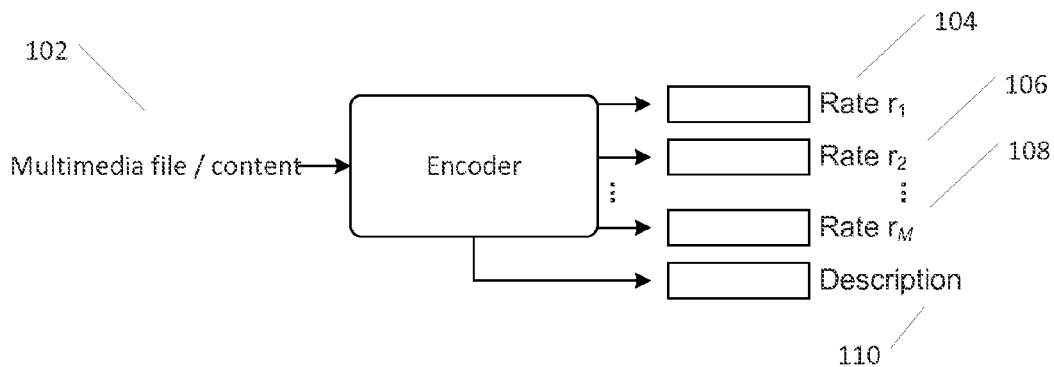
FIG. 1 depicts an example of multimedia content encoded at different bit rates.

In an adaptive streaming system, a content provider may offer streaming content 102 at different bit rates 104, 106, 108, for example, as illustrated in FIG. 1. The content may be encoded at a number of target bit rates (e.g., $r_1, r_2 \ldots r_M$). To achieve these target bit rates, one or more of the following parameters may be changed: visual quality or SNR; frame resolution; frame rate; sampling rate; number of channels; and/or codec. A description file 110 associated with the streaming content (e.g., a Media Presentation Description (MPD)) may provide technical information and/or metadata associated with the streaming content and/or its multiple representations and may enable selection of one or more different available bit rates. The description file (e.g., MPD) may be referred to as a manifest.

Publishing of streaming content at multiple rates may increase production, quality assurance (QA), management, and/or storage costs associated with the streaming content, such that the number of available rates and/or resolutions of the streaming content made available may be limited.

Figure 2:
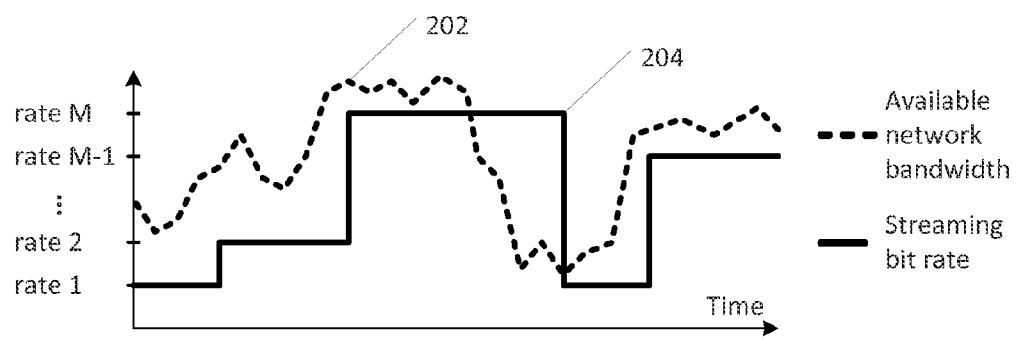
FIG. 2 depicts an example of adaptive streaming.

A streaming client, such as a streaming media player, that supports bandwidth adaptation may learn about available bit rates from a media content description, for example. A streaming client may measure and/or estimate available bandwidth 202 and/or may control an associated streaming session, for example, by requesting segments at different bit rates 204, which may allow the streaming client to adapt to bandwidth fluctuations during playback of multimedia content, for example, as illustrated in FIG. 2. A streaming client may measure and/or estimate available bandwidth 202 based on one or more of a buffer level, an error rate, a delay jitter, etc. In addition to available bandwidth, a streaming client may consider one or more other factors, such as viewing conditions, for example, in making decisions pertaining to bit rates and/or segments to use in a streaming session.

Stream switching behavior may be controlled by a server, for example, based on streaming client and/or network feedback. For example, such a model may be implemented with streaming technologies that are based on Real-time Transport Protocol (RTP) and/or Real Time Streaming Protocol (RTSP) protocols.

Access network bandwidth available for use by one or more streaming clients associated with the access network may vary, for example, due to one or more of an underlying communications technology used by the access network (e.g., as depicted in the table of FIG. 3), a number of users associated with the access network, respective locations of the one or more streaming clients relative to the access network, a signal strength associated with the access network, or the like.

Streaming content may be rendered in varying resolutions, for example, in accordance with a device that renders the streaming content (e.g., smartphone, a tablet, a laptop, a High Definition television (HDTV), etc.). The table of FIG. 4 depicts associated screen resolutions of example devices that may have multimedia streaming capabilities. The table of FIG. 5 depicts example standard screen resolutions with which streaming content may conform.

Content providers may use HTTP progressive downloading to distribute multimedia content, for example, wherein the content may be downloaded (e.g., partially or fully) before it may be played back. HTTP transport protocol may be likely to pass through (e.g., not be blocked by) a firewall, whereas transport protocols other than HTTP (e.g., RTP, RTSP, multicasting, and the like) may be likely to be blocked by a firewall and/or may be disabled by internet service provider (ISP). However, progressive downloading may not support bandwidth adaptation.

Figure 6:
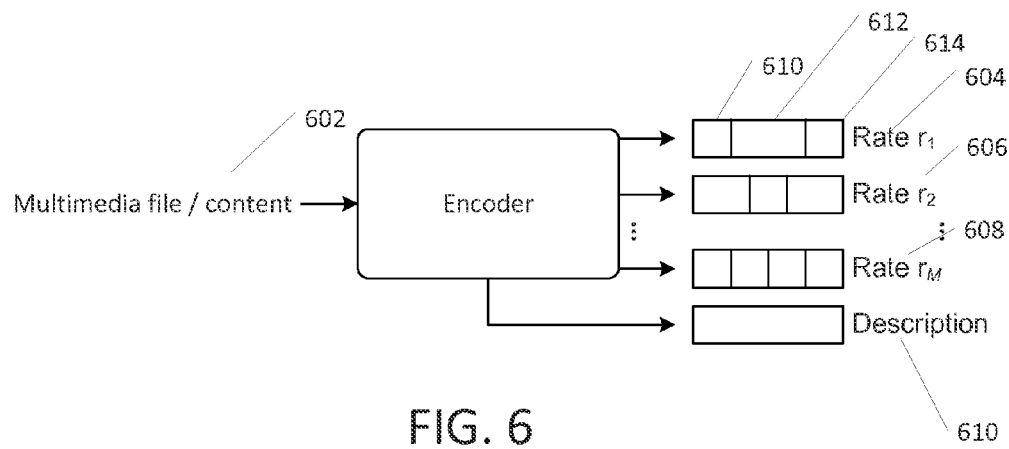
FIG. 6 depicts an example of multimedia content encoded at different bit fates and partitioned into segments.

In adaptive streaming, for example over HTTP, content 602 (e.g., a media presentation) may be encoded at a number of bit rates 604, 606, 608. Each respective encoding may be partitioned into one or more segments of shorter duration, e.g., as illustrated in FIG. 6. For example, the encoding at bit rate $r_1$ may be partitioned into segments 610, 612, 614. A streaming client may implement rate adaptation, for example, by using HTTP to request segments at a bit rate that may be selected in accordance with one or more network conditions that may affect the streaming client.

Figure 7:
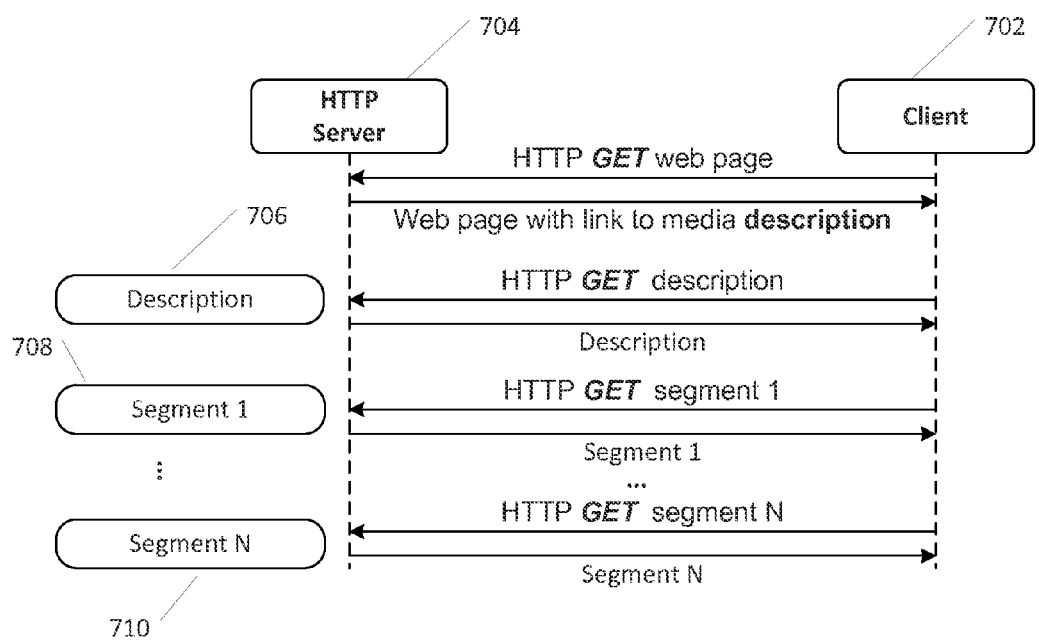
FIG. 7 depicts an example Hypertext Transfer Protocol (HTTP) streaming session.

FIG. 7 depicts an example sequence of interactions that may occur between a streaming client 702 and an associated HTTP server 704 during a streaming session. An MPD file 706 and/or one or more segments 708, 710 corresponding to a content stream may be obtained by means of HTTP GET requests, for example, issued by the client 702. The MPD file 706 may specify respective locations of one or more segments, for example by Uniform Resource Locators (URLs).

Figure 8A:
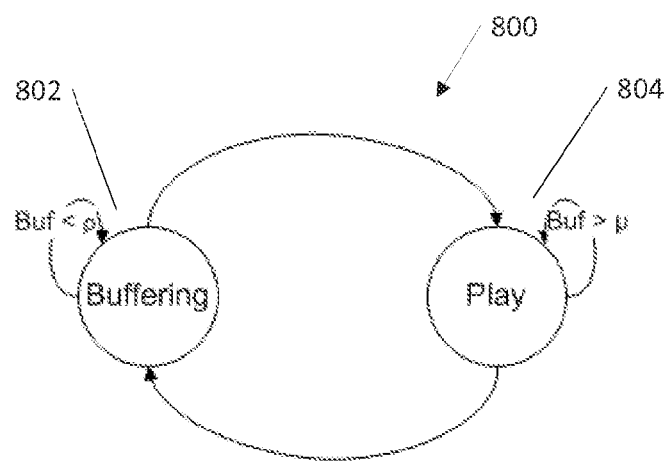
FIGS. 8A-8C depict example state aid buffer models of an example HTTP streaming video player.
Figure 8B:
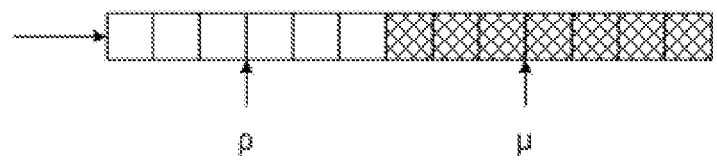
Figure 8C:
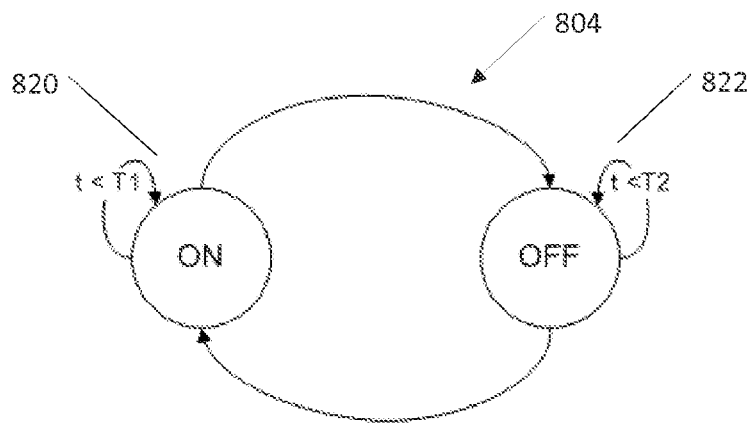

An adaptive HTTP player may be modeled as a state machine 800, for example, having at least a Buffering state 802 and a Play state 804, as illustrated in FIGS. 8A-8C. When the adaptive HTTP player operates in the Buffering state 802, HTTP GET requests may be sent continuously (e.g., one after another) without an interruption, for example, until a predetermined buffer level ρ, as depicted in FIG. 8B, is reached. When the adaptive HTTP player operates in the Play state 804, HTTP GET requests may be sent every T seconds, for example, in order to keep the buffer level above μ. The Buffering state may be adjusted, for example, if seek forward or seek backward is applied.

The Play state 804 may be further divided into an ON state 820 and an OFF state 822, as illustrated in FIG. 8C. When the adaptive HTTP player operates in the ON state 820, HTTP GET requests may be sent continuously for a period of time that may be denoted as T1 seconds. A playback time that may correspond to segments obtained by one or more GET requests, may be expressed as:

$$T=T1+T2 \qquad (1)$$

where T2 is a residual, such that T1<T2, e.g., T1<<T2.

If an available network bandwidth is larger than a maximum bitrate for one or more video segments presented in the MPD, an adaptive HTTP player may delay sending one or more subsequent HTTP GET requests, for example for a period of T2 seconds. One or more HTTP GET requests (e.g., N HTTP GET requests) may be sent in an interval of T seconds. The one or more HTTP GET requests may take effect for T1 seconds. When the adaptive HTTP player operates in the ON state 820, a bandwidth estimation may be calculated.

When the adaptive HTTP player operates in the OFF state 822, monitoring of a playback buffer may be applied, which may result in respective changes to one or more player parameters such as T1, T2, ρ, and/or μ.

An HTTP streaming video player may store one or more received segments (e.g., a full collection of received segments) locally (e.g., in a buffer associated with the HTTP streaming video player), so as to allow rewind operations, for example. The buffer may be implemented (e.g., logically) as an infinite buffer having sliding pointers ρ and μ.

An effective bandwidth may be estimated (e.g., calculated), for example, at an observation point (i) that may occur in accordance with an interval of T seconds (e.g., an observation point (i) that occurs once every T seconds). For example, an effective bandwidth estimation may be expressed as:

$$effectiveBandwidth(i) = \sum_{n=1}^{N} \frac{seg\_size(n)}{T_a(n) - T_b(n)} \quad (2)$$

where $T_b$=the time of sending the HTTP GET request, $T_a$=the time of receiving the last byte of the HTTP GET request, seg_size=the multimedia segment size in bits, and N=the number of HTTP GET requests in this observation period.

An effective bandwidth estimation calculated with equation (2) may not be reliable. For example, in a scenario where the bandwidth estimation is performed using T intervals that correspond to small amounts of time, the bandwidth estimation may include one or more sudden upward and/or downward spikes in bandwidth that may cause the effective bandwidth estimation to be inaccurate. Such inaccuracy may be at least partially avoided by applying a weighting in accordance with one or more previous effective bandwidth estimates. This weighting may be expressed as, for example:

$$weightedBandwidth(i) = \quad (3)$$
$$F * \sum_{j=0}^{J} w_j * effectiveBandwidth(i - j)$$

$$\sum_{j=0}^{J} w_j = 1$$

where parameter F may act as a stability factor and $w_j$ (j=0 . . . J) may be representative of weights assigned to one or more prior effective bandwidth estimates. For example, a value of F=0.95 may be selected. If J=1, values of $w_0$=0.8 and $w_1$=0.2 may be selected.

A downloading potential associated with bandwidth estimation may be expressed, for example, as a ratio of a segment duration (e.g., seg_duration) to a time it may take for the segment to be downloaded (e.g., from an associated network). For example, if one or more segments are downloaded from a cache (e.g., a nearby HTTP cache proxy), the ratio may be greater than 1. The ratio may be referred to as a download ratio, and may be expressed as, for example:

$$downloadRatio(i) = \frac{\sum_{n=1}^{N} seg\_duration(n)}{\sum_{n=1}^{N} (T_a(n) - T_b(n))} \quad (4)$$

A median effective bandwidth may be determined. For example, in a scenario that involves streaming a large amount of content (e.g., a long movie), a minimum bandwidth (e.g., minBandwidth) and/or a maximum bandwidth (e.g., maxBandwidth) may be observed, for example, at a beginning of the movie, from which a median effective bandwidth may be derived.

A rate adaptation technique may apply one or more ratio measurements, for example, a ratio of a rate of proposed quality to a rate of observed quality (e.g., current quality), that may be expressed, for example, as:

$$switchRatio(Q(i)) = \frac{rate(Q(i))}{rate(Q(i-1))} \quad (5)$$

where Q(i−1)=current quality and Q(i)=proposed quality (≤M).

A rate adaption algorithm may be classified, for example, as a single step technique or a step-wise scale-up/scale-down technique. In accordance with a single step technique, a maximum proposed quality may be selected, for example, using:

$Q(i)$=max{$m$+1, . . . $M$; where switchRatio ($m$)≤downloadRatio($i$)}

Application of a single step technique to a HTTP player may result in one or more quality changes than may be objectionable, for example to a user of the HTTP player. A step-wise technique may limit quality level changes between adjacent segments, for example, to:

$Q(i-1)-\Delta \leq Q(i) \leq Q(i-1)+\Delta$ where Δ may be a maximum allowed step size (e.g., Δ=1, 2 or 3).

Rate adaptation may be designed to improve (e.g., maximize) a bandwidth utilization ratio, for example, and may be expressed as:

$$bandwidthUtilization = \sum_{i=0}^{I} \frac{rate(Q(i))}{\max\{effectiveBandwidth(i), rate(M)\}} \quad (6)$$

where I=a number of observation points (i) for a whole of a duration of the multimedia experience.

Optimization of the bandwidthUtilization for example, to a select class of multimedia content may not correlate to an improved multimedia experience from the perspective of an associated end user. Users of multimedia services may be concerned with a constant perceived frame rate, minimal noticeable quality variations, clarity of video and audio content throughout a multimedia session, the ability to access multimedia content from different devices with minimal interruptions, and/or other considerations. Other considerations may include, for example, fairness of networking resource sharing among clients, and sensibility of decisions about splitting of effective bandwidth among various media components, such as video, audio, timed text, and/or presentation slides.

Rate adaptation may include employing one or more parameters that are associated with a hypothesis. A rate adaptation technique that implements two or more such hypotheses, such as a plurality of hypotheses, may be referred to herein as a multi-hypothesis rate adaptation technique. A multi-hypothesis rate adaptation technique may be optimized for one or more wireless multimedia (e.g., video) streaming scenarios. For example, a multi-hypothesis rate adaptation technique may be optimized to account for variations of one or more channel conditions and/or access technology changes that may occur during an associated streaming session (e.g., in the case of streaming a long video).

A hypothesis may correspond to one or more parameters (e.g., measured, theoretical, etc.) of a streaming session (e.g., an HTTP streaming session) that may be encountered by a participant of a streaming session (e.g., a streaming client, a streaming server, etc.). Streaming session parameters may include, for example, a variation in an amount of effective bandwidth available to a streaming client over an interval of time (e.g., a fixed, gradual decrease or increase, a step change, sudden drop, etc.), usage of a proxy cache, and/or advertisement-sponsored video streaming.

For each hypothesis, one or more associated parameters may be specified e.g., $T_h$, $T1_h$, $T2_h$, $\rho_h$, $\mu_h$, $\Delta_h$, etc.) that may be employed by a participant of a streaming session having one or more parameters that at least partially resemble those of the hypothesis. One or more of the specified parameters may be optimized in accordance with the parameters of the hypothesis, for instance, to improve (e.g., maximize) a quality of a user experience associated with a streaming session that at least partially resembles the hypothesis.

Figure 9A:
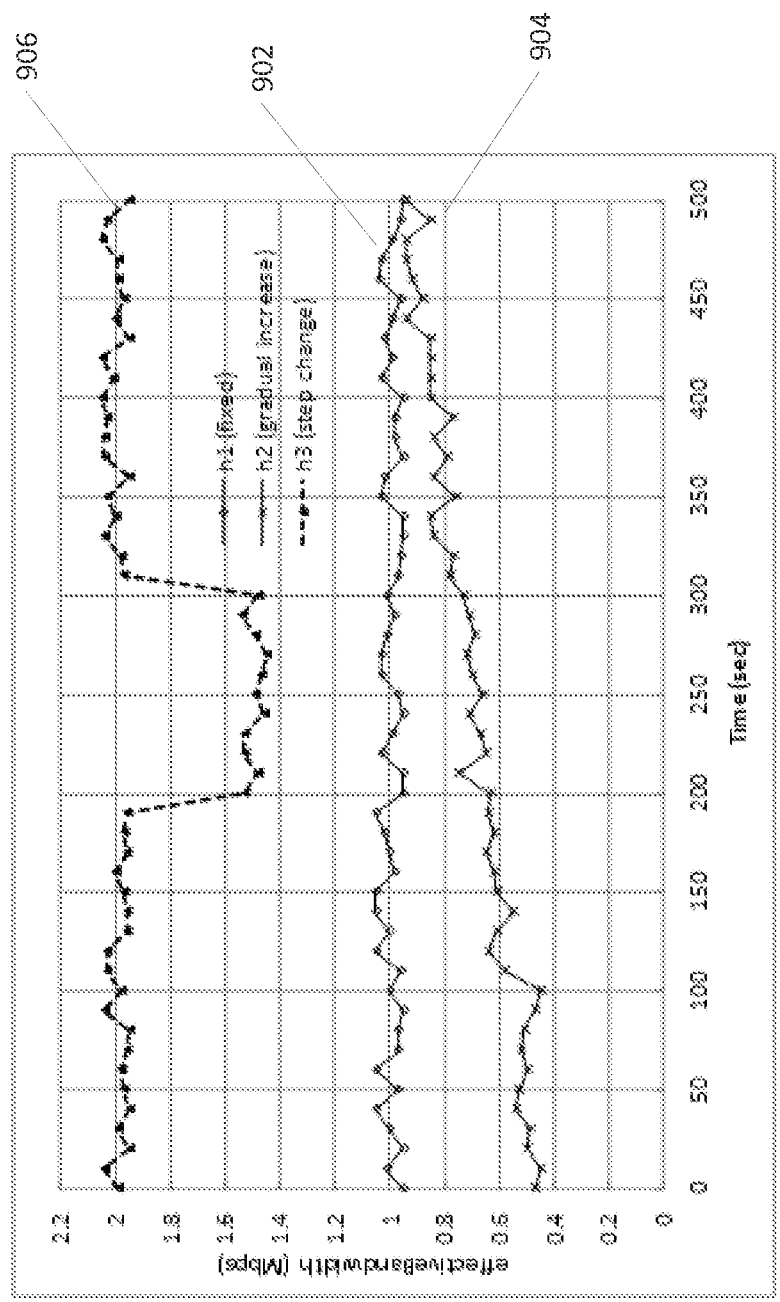
FIG. 9A is a graph of example fixed, gradual increase, and step change traffic patterns to which multi-hypothesis rate adaptation may be applied.
Figure 9B:
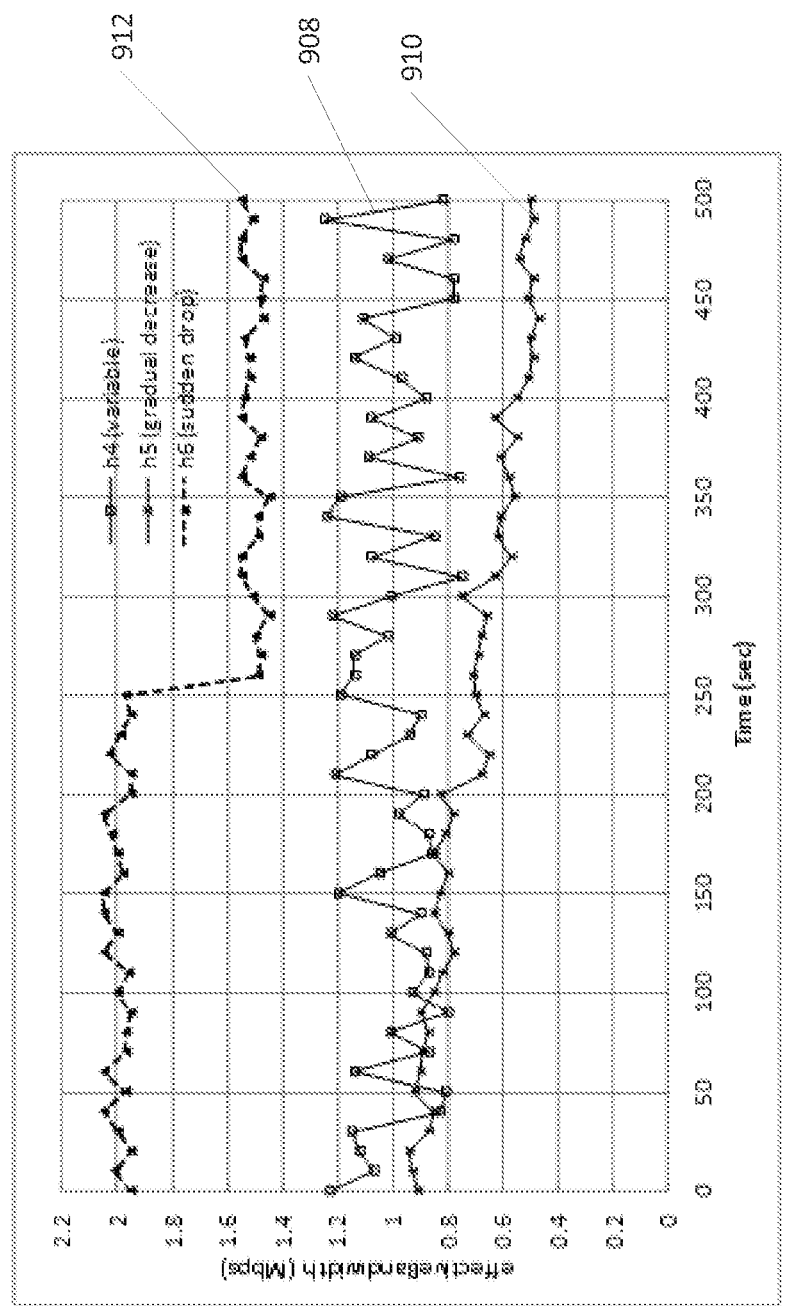
FIG. 9B is a graph of example variable, gradual decrease, and sudden drop traffic patterns to which multi-hypothesis rate adaptation may be applied.
Figure 9C:
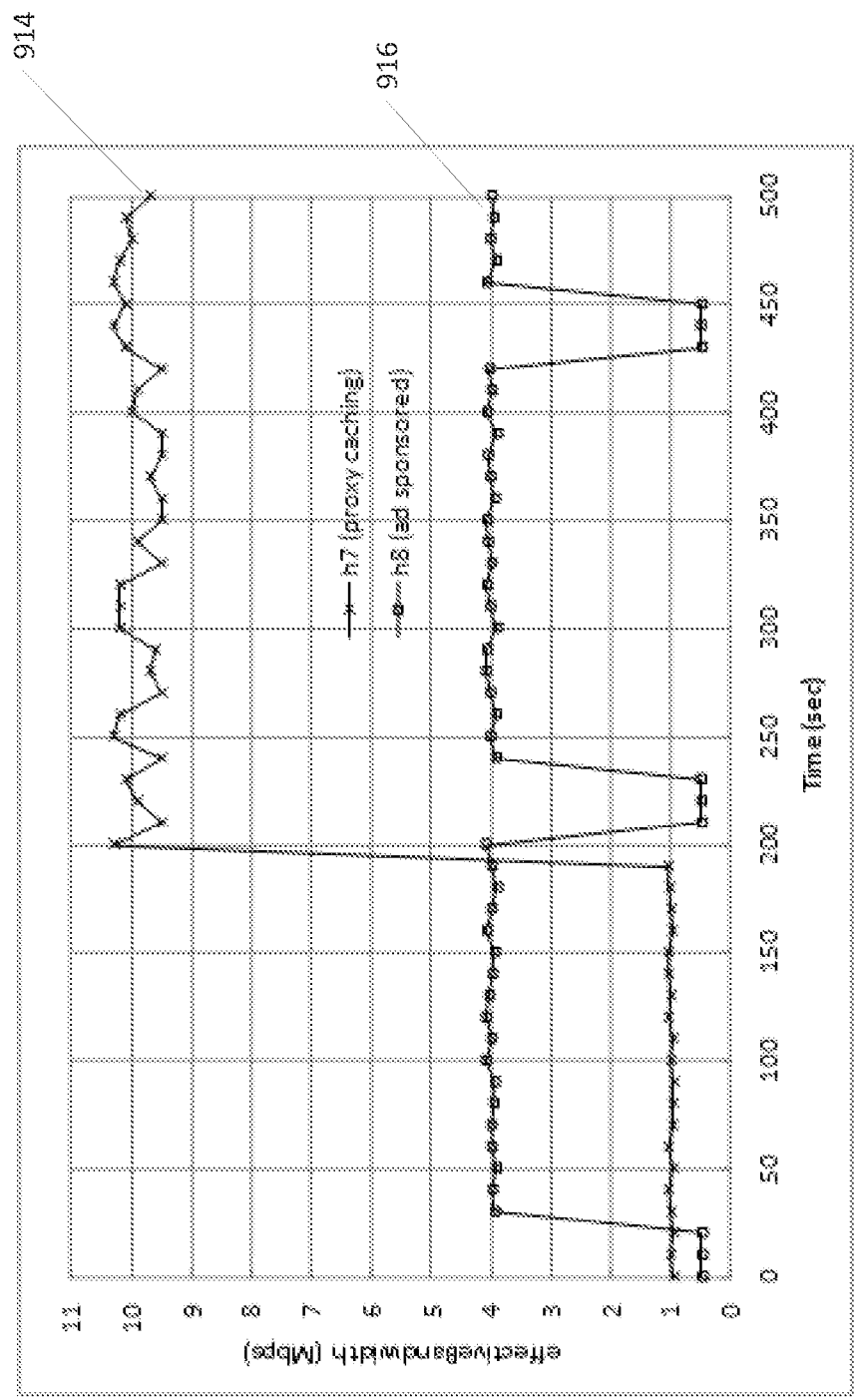
FIG. 9C is a graph of example proxy caching and ad sponsored traffic patterns to which multi-hypothesis rate adaptation may be applied.

FIGS. 9A-9C illustrate examples of effective bandwidth variation during respective HTTP streaming sessions to which multi-hypothesis rate adaptation may be applied. FIG. 9A illustrates three examples 902, 904, 906 of streaming session bandwidth variability. Example 902 illustrates an exemplary streaming session taking place over a broadband network with minimal bandwidth usage from other applications running on the streaming client device, which may result in an effective bandwidth that is an effectively fixed rate bandwidth. Example 904 illustrates an exemplary streaming session during which an effective bandwidth may gradually increase, for example, as may occur when a streaming client moves to an area with improved coverage (e.g., from a rural area to an urban area). Example 906 illustrates an exemplary streaming session during which effective bandwidth may experience a temporary drop (e.g., a step change) over a period of time, for example as may be experienced by a Long Term Evolution (LTE) streaming client that suffers high packet losses for an interval of time.

FIG. 9B illustrates three further examples 908, 910, 912 of streaming session bandwidth variability. Example 908 illustrates an exemplary streaming session during which effective bandwidth varies substantially, for example, as may be experienced by a streaming participating in a streaming session established over a wireless network. Example 910 illustrates an exemplary streaming session during which effective bandwidth may gradually decrease, for example, as may occur when a streaming client moves to an area with poorer coverage (e.g., from an urban area to a rural area). Example 912 illustrates an exemplary streaming session during which effective bandwidth drops suddenly, for example as may be experienced by a streaming client as its access technology changes from a broadband network to a wireless network.

FIG. 9C illustrates two further examples 914, 916 of streaming session bandwidth variability. Example 914 illustrates an exemplary streaming session during which effective bandwidth may suddenly increase substantially, for example as may be experienced when a streaming client receives one or segments from a HTTP proxy cache, for e, a HTTP proxy cache located nearby the streaming client. Example 916 illustrates an exemplary streaming session during which effective bandwidth may fluctuate during one or more predetermined intervals, for example in accordance with an advertisement sponsored video streaming session (e.g., where 30 seconds of advertisement messages may be inserted every 3 minutes).

Figures 10, 11:
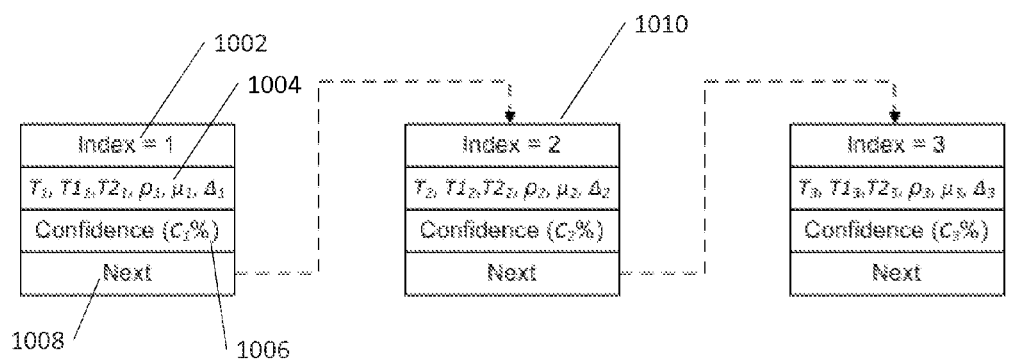
FIG. 10 depicts an example hypothesis representation.
FIG. 11 is a table of example parameter representations for respective events.

Each rate variability hypothesis may be uniquely represented, for example, to allow an HTTP streaming client (e.g., an HTTP player) to select one or more appropriate rate adaptation actions. FIG. 10 depicts an example hypothesis representation. For example, a hypothesis (e.g., each hypothesis of a plurality of hypotheses) may be represented as a unique integer Index value 1002 that may be stored, for example in a lookup table that may be accessed by the streaming client. One or more respective parameter values 1004 (e.g., $T_h$, $T1_h$, $T2_h$, $\rho_h$, $\mu_h$, $\Delta_h$, etc.) may be associated with each hypothesis and may be stored along with each hypothesis, for example, in the lookup table. A respective confidence value 1006 may be associated with each hypothesis and/or may be stored in the lookup table. The confidence value may indicate, for example, using a percentage value (e.g., a percentage over a certain threshold, a highest percentage, etc.), a likelihood that the hypothesis may apply to an established streaming session. Each hypothesis may also be associated with a link 1008 to a suggested next hypothesis 1010 to be applied by the streaming client, for example, if an associated confidence value falls below a predetermined threshold. The link 1008 to a suggested next hypothesis 1010 may be stored in the lookup table.

The content of a hypothesis may be modified. For example, a streaming client may modify a hypothesis in accordance with collected historical data, e.g., from one or more multimedia streaming sessions and/or with feedback (e.g., feedback collected from respective streaming clients associated with one or more end users). A modified hypothesis and/or an associated lookup table may be shared (e.g., communicated) among streaming clients.

One or more parameters for use by a streaming client may be pre-calculated, for example, based upon feedback data pertaining to one or more hypotheses having parameters that resemble those of an established streaming session. Feedback may be based, for example, on a mean value of feedback data received from streaming clients associated with one or more end users streaming the same content. The feedback may be volunteered, for example by one or more end users and/or may otherwise be submitted and/or collected for transmission to a streaming client. In order to create one or more hypotheses that may be associated with a streaming session, one or more tools (e.g., DummyNet) may be used to inject dummy bandwidth at a server and/or client side of the streaming session, for example to produce one or more hypotheses having parameters that may be similar to the example streaming sessions depicted in FIGS. 9A-9C.

A device participating in a streaming session (e.g., a streaming client) may detect an event (e.g., a change in effective bandwidth such as those as illustrated in FIGS. 9A-9C) that may correspond to one or more observation points (i) (e.g., a number of predefined observation points (i)). For example, a streaming client may detect an event using information from a radio stack and/or one or more sensors associated with the streaming client, which may include one or more of the following: a signal strength; a progression of signal strength over a period of time; an offloading status (e.g., WiFi to 3G and/or 4G wireless); data from an accelerometer; location information from a GPS sensor; and the like. A streaming client may aggregate information from multiple sensors, e.g., in order to enhance event detection reliability (e.g., to enhance reliability of an effective bandwidth estimate).

A streaming client may use previously calculated information for event detection (e.g., previously calculated effectiveBandwidth and/or downloadRatio values), for example, in an absence of sensor information. For example, a streaming client may detect an event using one or more of the following: a statistical mean and/or variance of effectiveBandwidth and/or downloadRatio values; a peak to mean ratio of effectiveBandwidth and/or downloadRatio values; an absolute difference between two adjacent effectiveBandwidth values; a minimum and maximum peak and/or duration associated with a drop in effectiveBandwidth; and the like.

Event parameters may be denoted as, for example, $a_{1,h}$, $a_{2,h}$, $a_{3,h}$, and $a_{K,h}$, where K may represent an overall number of parameters. Respective weighting factors may be associated with one or more parameters (e.g., for each parameter). The weighting factors may be used for calculating a respective confidence level for each hypothesis which may be donated as, for example, $b_{1,h}$, $b_{2,h}$, $b_{3,h}$, and $b_{K,h}$, which may be expressed as:

$$\Sigma_{k=1}^{K} b_{k,h} = 1 \qquad (7)$$

FIG. 11 depicts an example lookup table including parameter representations of events that may correspond to hypotheses.

An average absolute difference E(h,i) for observation parameters $a_k(i)$ pertaining to a hypothesis h may be represented by the following:

$$E(h, i) = \sum_{k=1}^{K} \left( b_{k,h} * \frac{f(a_k(i), a_{k,h})}{a_{k,h}} \right) \qquad (8)$$

$$f(x, y) = \begin{cases} y, & abs(y-x) > y \\ abs(y-x), & \text{otherwise} \end{cases}$$

where f(x,y) a function that may ensure that a maximum value for E(h,i) may be 1.

A confidence level for a hypothesis may be calculated using:

$$C_h(i) = 100 * \left[ 1 - \frac{f(E(h, i), E(i)_{min})}{E(i)_{min}} \right] \qquad (9)$$

$$E(i)_{min} = \min_h (E(h, i))$$

A streaming client (e.g., a HTTP player) may select a hypothesis h with a highest (e.g., maximum) confidence level $C_h(i)$. A confidence level of a closest hypothesis may be considered in a hypothesis selection decision.

Rate adaptation may be implemented for a streaming session, for example, when one or more video segments referred to by HTTP GET requests of the streaming session are provided to a streaming client from a cache (e.g., a HTTP proxy cache), as may be illustrated by example 914 in FIG. 9C. Such an event may be detected, for example, by the streaming client observing a sudden and substantial increase in an effective bandwidth estimation associated with the streaming session.

HTTP response from an HTTP proxy may include multi-portion data, such that a first portion of the HTTP response may include segment data that was requested by the HTTP GET request and a second portion of the HTTP response may include a summary of one or more other content segments that may be related to the HTTP GET request.

For example, a streaming client may send an HTTP GET request to retrieve a media segment (e.g., http://www.video.com/video1/seg2_quality1) that may pass through or be intercepted by an HTTP proxy. If the HTTP proxy has a cached copy of the requested segment and/or other segments, an HTTP response from the HTTP proxy may include one or more of the following: content corresponding to http://www.video.com/video1/seg2_quality1; one or more cache control parameters (e.g., cache validity timers); and/or a Media Presentation Description (MPD) corresponding to the cached http://www.video.com/video1 content. The MPD may describe respective content representations of segments of http://www.video.com/video1 that may be cached by the HTTP proxy.

Providing cache control parameters and/or a cache MPD to a streaming client in an HTTP response may help the streaming client to determine one or more representations (e.g., representations associated with http://www.video.com/video1) that may be desirable to retrieve, for example, if the streaming client wants to retrieve one or more additional segments of http://www.video.com/video1 from the HTTP proxy cache, so as to save bandwidth and/or reduce delay, for example.

Figure 12:
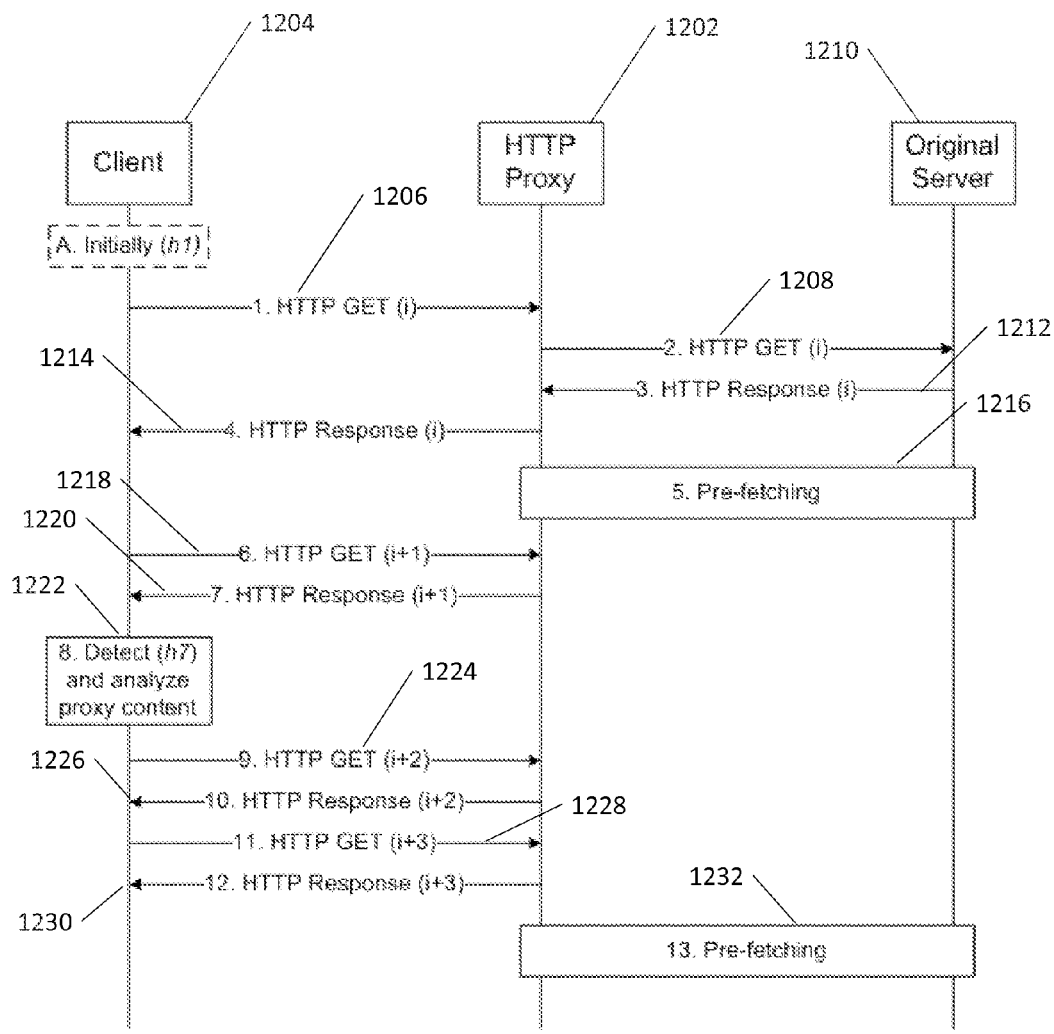
FIG. 12 depicts an example message chart for rate adaptation of a streaming session involving a HTTP proxy.

FIG. 12 depicts an example message diagram for rate adaptation of a streaming session involving a HTTP proxy 1202, including a number of HTTP GET requests that may pass through the HTTP proxy 1202. For example, a streaming client 1204 (e.g.; a HTTP player) may initially be participating in a streaming session in accordance with a default hypothesis, for example 902 illustrated in FIG. 9A.

At 1206, the streaming client 1204 may send an HTTP GET request (i) for a video content segment. The HTTP GET request may be intercepted by the HTTP proxy 1202. The HTTP GET request from the streaming client 1204 may include a header (e.g., a custom HTTP header) that may signal that the streaming client is interested in receiving video segments from, for example, a Dynamic Adaptive Streaming over HTTP (DASH)-aware proxy cache. An example custom HTTP header may be, for example:

x-accept-dash-proxy: no\n\r

If the streaming client 1204 is not interested in receiving a video segment (e.g., a valid video segment copy) from the DASH-aware proxy, it may send a HTTP GET request that may be, for example:

x-accept-dash-proxy: no\n\r

At 1208, the HTTP proxy 1202 may analyze the HTTP GET request (i), for example, to determine if there is a cached copy of the requested video segment and/or may determine the validity of such cached content. The HTTP GET request may be forwarded to a streaming server (e.g., an original video server, or original server 1210, associated with the requested video segment) if the requested video content segment is not in the HTTP proxy cache. The streaming client 1204 may request a fresh copy of the video segment from the original server 1210, for example, to accurately determine an effective bandwidth between the streaming client 1204 and the original server 1210. If the HTTP proxy cache is DASH-unaware, the HTTP proxy cache may disregard the custom header of the HTTP GET request and may operate in accordance with a normal cache proxy.

At 1212, the original server 1210 may respond to the HTTP proxy and may send the requested video segment to the HTTP proxy 1202.

At 1214, the HTTP proxy 1202 may forward the response to the streaming client 1204. The HTTP proxy 1202 may include one or more cache control parameters in the response. The HTTP proxy 1202 may include a custom HTTP header, for example, to signal to the streaming client 1204 an existence of a DASH-aware proxy that may have copies of one or more video segments from the original video server. An example custom HTTP header may be, for example:

x-dash-proxy-server: http(s)://dash_proxy/mpd_uri\n\r where x-dash-proxy-server may point to an MPD resource that may be located within a nearby DASH-aware proxy. If the streaming client 1204 does not support corresponding protocols of one or more DASH-aware proxies, the streaming client 1204 may disregard the custom HTTP header field and may operate in accordance with a normal DASH client.

At 1216, the HTTP proxy 1202 may prefetch content (e.g., perform one or more prefetching techniques), for example, to improve a cache hit ratio that may be associated with a large number of streaming clients. The HTTP proxy 1202 may proactively download an associated original MPD and/or one or more video segments from the original server 1210. A streaming client (e.g., a DASH streaming client) may send an HTTP GET request to query an MPD of the HTTP proxy. The MPD of the HTTP proxy may be a subset of the original MPD. For a streaming session involving a long video, for example, the streaming client 1204 may query the HTTP proxy 1202 several times, so as to get a latest MPD as one or more video segments are added and/or removed from the cache of the HTTP proxy 1202.

At 1218, the streaming client 1204 may send an HTTP GET request (i+1) for a video segment to the HTTP proxy 1202.

At 1220, the HTTP proxy 1202 may respond to the streaming client 1204 and may send a cached copy of the requested video segment to the streaming client 1202.

At 1222, the streaming client 1204 may detect an event corresponding to a change in effective bandwidth associated with the streaming session, for example, as illustrated by example 914 of FIG. 9C. The streaming client 1204 (e.g., a rate control mechanism and/or algorithm associated with the streaming client 1204) may prefer retrieving a representation of one or more segments (e.g., a subsequent, sequential segment) that may be cached by the HTTP proxy, for example, if a quality of the cached segment (e.g., Q(i+2)) is within a Δ range of a previously downloaded segment (e.g., an immediately previously downloaded segment).

At 1224, the streaming client 1204 may send an HTTP GET request (i+2) for the next video segment to the HTTP proxy 1202.

At 1226, the HTTP proxy 1202 may respond and may send a cached copy of the requested next video segment to the streaming client 1204.

At 1228, the streaming client 1204 may send an HTTP GET request (i+3) for a following video segment to the HTTP proxy 1202.

At 1230, the HTTP proxy 1202 may respond and may send a cached copy of the requested following video segment to the streaming client 1204.

At 1232, the HTTP proxy 1202 may perform a prefetching step, for example, to prepare for one or more future video segment requests.

The HTTP proxy 1202 may store (e.g., in a HTTP proxy cache) one or more video segments per representation, for example, for one or more video segments that may be requested frequently (e.g., most frequently) by respective DASH streaming clients that are served by the HTTP proxy 1202. Streaming clients that are interested in receiving subsequent video segments that may not be stored in a cache of the HTTP proxy may perform one or more HTTP GET requests to an associated original server, for example. The one or more HTTP GET requests may be performed in parallel, for example, to receiving one or more cached video segments from the HTTP proxy.

Multimedia scenes may include several components, such as video, audio, images, captioned text, slides, and/or the like. In accordance with a manifest file (e.g., an MPD), a segment may carry one or more of media components as disclosed herein. With reference to equation (2) disclosed herein, for example, an effective bandwidth may be calculated for an overall multimedia streaming session, for example, at each observation point (i).

To determine a proposed representation quality Q(i) to be retrieved for each media component, a streaming device (e.g., a streaming client) may have knowledge pertaining to an importance of each media component relevant to the streaming session. For example, from the perspective of an end user, audio components may be more important than video components, such that when the effective bandwidth is substantially low, one or more media components other than audio components may be dropped in order to maximize quality of the audio components. Another end user, e.g., in another streaming session of a different type, may prioritize video components over audio components, such that when the effective bandwidth is substantially low, a media component other than a video component may be dropped to maximize the quality of a video component.

As an effective bandwidth associated with a streaming session (e.g., effectiveBandwidth) increases, overall bandwidth may be partitioned intelligently. For example, for one or more observation points (i) (e.g., each observation point (i)), a proposed representation quality Q(i) for a media component may be adjusted, for example, in accordance with a priority metric. A priority metric may reflect a proposed quality of experience pertaining to an overall multimedia streaming session.

Figure 13:
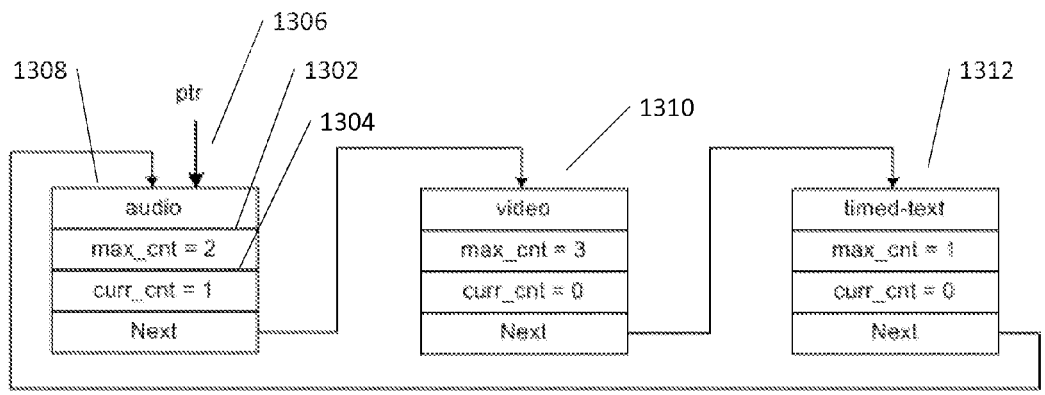
FIG. 13 depicts an example prioritization of media components.

FIG. 13 depicts an example prioritization of media components. Each media component may be associated with, for example, two counters: a maximum counter 1302 (max_cnt) and a current counter 1304 (curr_cnt). The maximum counter max_cnt may be a fixed value. If the current counter curr_cnt reaches the maximum counter max_cnt, it may move a pointer 1306 (ptr) to a next media component and/or may reset the current counter curr_cnt. For example, with reference to FIG. 13, audio, video, and timed-text streams may initially be assigned a value of zero for their effective bandwidth. Subsequently, audio streams may be adjusted in two consecutive observation points such that the audio streams 1308 take precedence over other media components (e.g., the video streams 1310 and timed-text streams 1312). Subsequently, the video streams 1310 may be adjusted in three consecutive observation points such that the video segments 1310 take precedence over timed-text streams 1312. Prioritization of media components is not limited to the illustrated example of FIG. 13.

The rate adaptation techniques described herein (e.g., multi-hypothesis rate adaptation techniques) may be applied to suitable HTTP-based streaming systems, including one or more of the following: Dynamic Adaptive Streaming over HTTP (DASH) (e.g., MPEG DASH); Apple® HTTP Live Streaming (HLS); Microsoft® Smooth Streaming; Adobe® HTTP Dynamic Streaming; Open IPTV Forum HTTP Adaptive Streaming (HAS); 3GPP Adaptive HTTP Streaming (AHS); or the like.

The rate adaptation techniques (e.g., multi-hypothesis rate adaptation techniques) disclosed herein may be implemented in accordance with multimedia streaming sessions performed in a wireless communication system, such as the example wireless communication system 1400, and components thereof, illustrated in FIGS. 14A-14E.

Figure 14A:
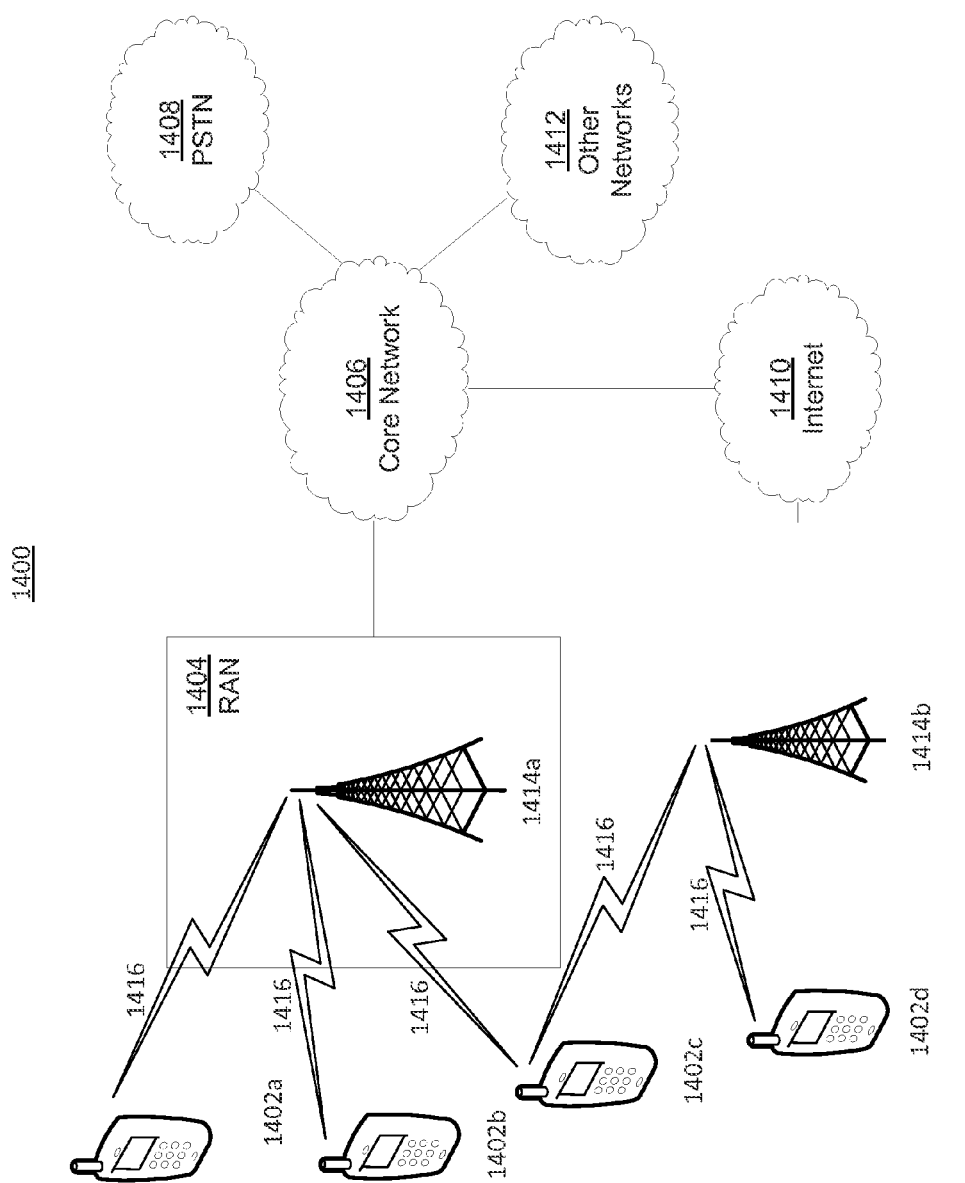
FIG. 14A depicts a system diagram of an example communications system in which one or more disclosed embodiments may be implemented.

FIG. 14A is a diagram of an example communications system 1400 in which one or more disclosed embodiments may be implemented. The communications system 1400 may be a multiple access system that provides content, such as voice, data, video, messaging, broadcast, etc., to multiple wireless users. The communications system 1400 may enable multiple wireless users to access such content through the sharing of system resources, including wireless bandwidth. For example, the communications systems 1400 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 14A, the communications system 1400 may include at least one wireless transmit/receive unit (WTRU), such as a plurality of WTRUs, for instance WTRUs 1402a, 1402b, 1402c, and 1402d, a radio access network (RAN) 1404, a core network 1406, a public switched telephone network (PSTN) 1408, the Internet 1410, and other networks 1412, though it should be appreciated that the disclosed embodiments contemplate any number of WTRUs, base stations, networks, and/or network elements. Each of the WTRUs 1402a, 1402b, 1402c, 1402d may be any type of device configured to operate and/or communicate in a wireless environment. By way of example, the WTRUs 1402a, 1402b, 1402c, 1402d may be configured to transmit and/or receive wireless signals and may include user equipment (UE), a mobile station, a fixed or mobile subscriber unit, a pager, a cellular telephone, a personal digital assistant (PDA), smartphone, a laptop, a netbook, a personal computer, a wireless sensor, consumer electronics, and the like.

The communications systems 1400 may also include a base station 1414a and a base station 1414b. Each of the base stations 1414a, 1414b may be any type of device configured to wirelessly interface with at least one of the WTRUs 1402a, 1402b, 1402c, 1402d to facilitate access to one or more communication networks, such as the core network 1406, the Internet 1410, and/or the networks 1412. By way of example, the base stations 1414a, 1414b may be a base transceiver station (BTS), a Node-B, an eNode B, a Home Node B, a Home eNode B, a site controller, an access point (AP), a wireless router, and the like. While the base stations 1414a, 1414b are each depicted as a single element, it should be appreciated that the base stations 1414a, 1414b may include any number of interconnected base stations and/or network elements.

The base station 1414a may be part of the RAN 1404, which may also include other base stations and/or network elements (not shown), such as abase station controller (BSC), a radio network controller (RNC), relay nodes, etc.

The base station 1414a and/or the base station 1414b may be configured to transmit and/or receive wireless signals within a particular geographic region, which may be referred to as a cell (not shown). The cell may further be divided into cell sectors. For example, the cell associated with the base station 1414a may be divided into three sectors. Thus, in one embodiment, the base station 1414a may include three transceivers, i.e., one for each sector of the cell. In another embodiment, the base station 1414a may employ multiple-input multiple output (MIMO) technology and, therefore, may utilize multiple transceivers for each sector of the cell.

The base stations 1414a, 1414b may communicate with one or more of the WTRUs 1402a, 1402b, 1402c, 1402d over an air interface 1416, which may be any suitable wireless communication link (e.g., radio frequency (RF), microwave, infrared (IR), ultraviolet (UV), visible light, etc.). The air interface 1416 may be established using any suitable radio access technology (RAT).

More specifically, as noted above, the communications system 1400 may be a multiple access system and may employ one or more channel access schemes, such as CDMA, TDMA, FDMA, OFDMA, SC-FDMA, and the like. For example, the base station 1414a in the RAN 1404 and the WTRUs 1402a, 1402b, 1402c may implement a radio technology such as Universal Mobile Telecommunications System (UMTS) Terrestrial Radio Access (UTRA), which may establish the air interface 1416 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 1414a and the WTRUs 1402a, 1402b, 1402c may implement a radio technology such as Evolved UMTS Terrestrial Radio Access (E-UTRA), which may establish the air interface 1416 using Long Term Evolution (LTE) and/or LTE-Advanced (LTE-A).

In other embodiments, the base station 1414a and the WTRUs 1402a, 1402b, 1402c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1414b in FIG. 14A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 1414b and the WTRUs 1402c, 1402d may implement a radio technology such as IEEE 802.11 to establish a wireless local area network (WLAN). In another embodiment, the base station 1414b and the WTRUs 1402c, 1402d may implement a radio technology such as IEEE 802.15 to establish a wireless personal area network (WPAN). In yet another embodiment, the base station 1414b and the WTRUs 1402c, 1402d may utilize a cellular-based RAT (e.g., WCDMA, CDMA2000, GSM, LTE, LTE-A, etc.) to establish a picocell or femtocell. As shown in FIG. 14A, the base station 1414b may have a direct connection to the Internet 1410. Thus, the base station 1414b may not be required to access the Internet 1410 via the core network 1406.

The RAN 1404 may be in communication with the core network 1406, which may be any type of network configured to provide voice, data, applications, and/or voice over internet protocol (VoIP) services to one or more of the WTRUs 1402*a*, 1402*b*, 1402*c*, 1402*d*. For example, the core network 1406 may provide call control, billing services, mobile location-based services, pre-paid calling, Internet connectivity, video distribution, etc., and/or perform high-level security functions, such as user authentication. Although not shown in FIG. 14A, it should be appreciated that the RAN 1404 and/or the core network 1406 may be in direct or indirect communication with other RANs that employ the same RAT as the RAN 1404 or a different RAT. For example, in addition to being connected to the RAN 1404, which may be utilizing an E-UTRA radio technology, the core network 1406 may also be in communication with another RAN (not shown) employing a GSM radio technology.

The core network 1406 may also serve as a gateway for the WTRUs 1402*a*, 1402*b*, 1402*c*, 1402*d* to access the PSTN 1408, the Internet 1410, and/or other networks 1412. The PSTN 1408 may include circuit-switched telephone networks that provide plain old telephone service (POTS). The Internet 1410 may include a global system of interconnected computer networks and devices that use common communication protocols, such as the transmission control protocol (TCP), user datagram protocol (UDP) and the Internet protocol (IP) in the TCP/IP internet protocol suite. The networks 1412 may include wired or wireless communications networks owned and/or operated by other service providers. For example, the networks 1412 may include another core network connected to one or more RANs, which may employ the same RAT as the RAN 1404 or a different RAT.

Some or all of the WTRUs 1402*a*, 1402*b*, 1402*c*, 1402*d* in the communications system 1400 may include multi-mode capabilities, e.g., the WTRUs 1402*a*, 1402*b*, 1402*c*, 1402*d* may include multiple transceivers for communicating with different wireless networks over different wireless links. For example, the WTRU 1402*c* shown in FIG. 14A may be configured to communicate with the base station 1414*a*, which may employ a cellular-based radio technology, and with the base station 1414*b*, which may employ an IEEE 802 radio technology.

Figure 14B:
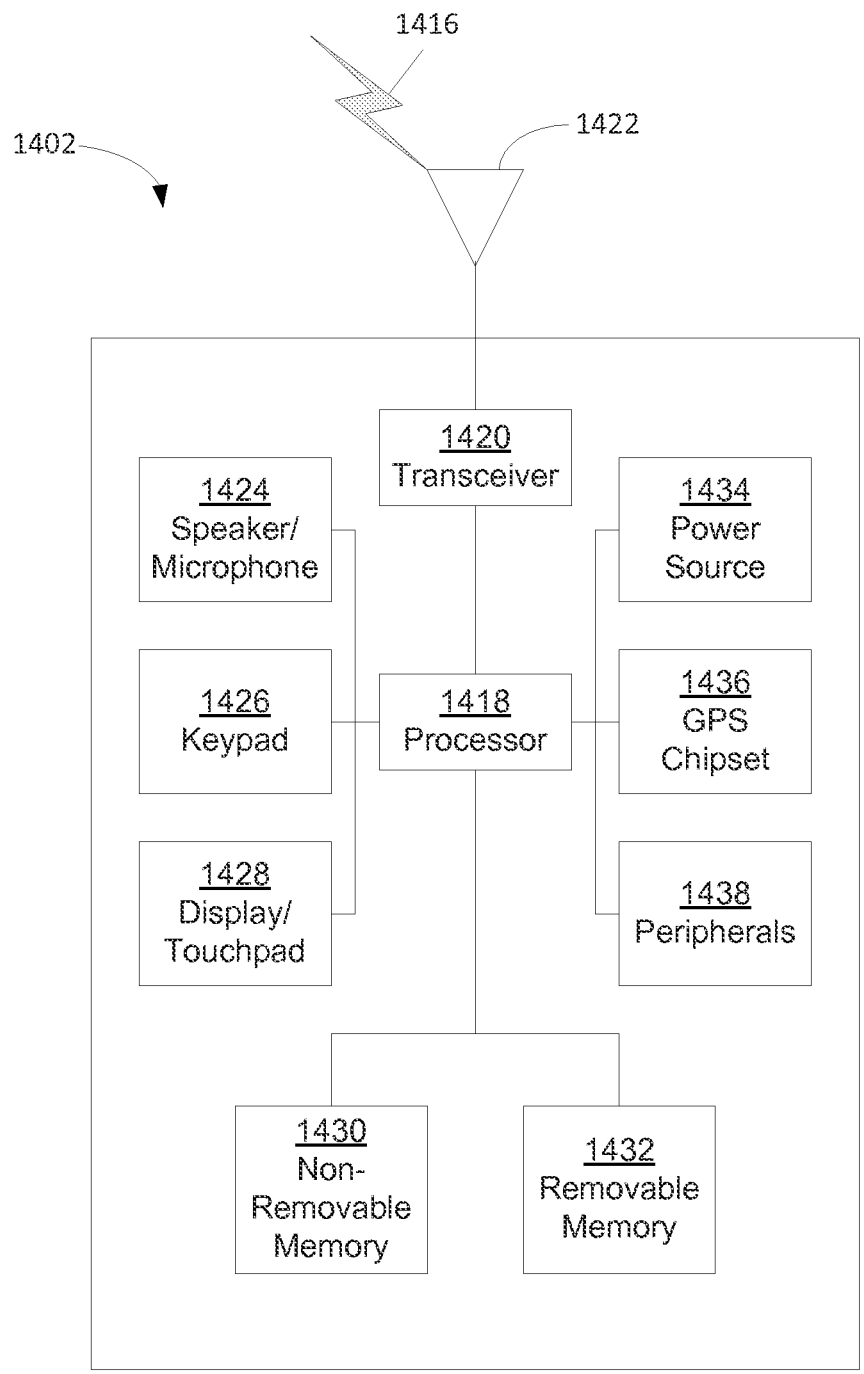
FIG. 14B depicts a system diagram of an example wireless transmit/receive unit (WTRU) that may be used within the communications system illustrated in FIG. 14A.

FIG. 14B is a system diagram of an example WTRU 1402. As shown in FIG. 14B, the WTRU 1402 may include a processor 1418, a transceiver 1420, a transmit/receive element 1422, a speaker/microphone 1424, a keypad 1426, a display/touchpad 1428, non-removable memory 1430, removable memory 1432, a power source 1434, a global positioning system (GPS) chipset 1436, and other peripherals 1438. It should be appreciated that the WTRU 1402 may include any sub-combination of the foregoing elements while remaining consistent with an embodiment.

The processor 1418 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1418 may perform signal coding, data processing, power control, input/output processing, and/or any other functionality that enables the WTRU 1402 to operate in a wireless environment. The processor 1418 may be coupled to the transceiver 1420, which may be coupled to the transmit/receive element 1422. While FIG. 14B depicts the processor 1418 and the transceiver 1420 as separate components, it should be appreciated that the processor 1418 and the transceiver 1420 may be integrated together in an electronic package or chip.

The transmit/receive element 1422 may be configured to transmit signals to, or receive signals from, abuse station (e.g., the base station 1414*a*) over the air interface 1416. For example, in one embodiment, the transmit/receive element 1422 may be an antenna configured to transmit and/or receive RF signals. In another embodiment, the transmit/receive element 1422 may be an emitter/detector configured to transmit and/or receive IR, UV, or visible light signals, for example. In yet another embodiment, the transmit/receive element 1422 may be configured to transmit and receive both RF and light signals. It should be appreciated that the transmit/receive element 1422 may be configured to transmit and/or receive any combination of wireless signals.

In addition, although the transmit/receive element 1422 is depicted in FIG. 14B as a single element, the WTRU 1402 may include any number of transmit/receive elements 1422. More specifically, the WTRU 1402 may employ MIMO technology. Thus, in one embodiment, the WTRU 1402 may include two or more transmit/receive elements 1422 (multiple antennas) for transmitting and receiving wireless signals over the air interface 1416.

The transceiver 1420 may be configured to modulate the signals that are to be transmitted by the transmit/receive element 1422 and to demodulate the signals that are received by the transmit/receive element 1422. As noted above, the WTRU 1402 may have multi-mode capabilities. Thus, the transceiver 1420 may include multiple transceivers for enabling the WTRU 1402 to communicate via multiple RATs, such as UTRA and IEEE 802.11, for example.

The processor 1418 of the WTRU 1402 may be coupled to, and may receive user input data from, the speaker/microphone 1424, the keypad 1426, and/or the display/touchpad 1428 (e.g., a liquid crystal display (LCD) display unit or organic light-emitting diode (OLED) display unit). The processor 1418 may also output user data to the speaker/microphone 1424, the keypad 1426, and/or the display/touchpad 1428. In addition, the processor 1418 may access information from, and store data in, any type of suitable memory, such as the non-removable memory 1430 and/or the removable memory 1432. The non-removable memory 1430 may include random-access memory (RAM), read-only memory (ROM), a hard disk, or any other type of memory storage device. The removable memory 1432 may include a subscriber identity module (SIM) card, a memory stick, a secure digital (SD) memory card, and the like. In other embodiments, the processor 1418 may access information from, and store data in, memory that is not physically located on the WTRU 1402, such as on a server or a home computer (not shown).

The processor 1418 may receive power from the power source 1434, and may be configured to distribute and/or control the power to the other components in the WTRU 1402. The power source 1434 may be any suitable device for powering the WTRU 1402. For example, the power source 1434 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1418 may also be coupled to the GPS chipset 1436, which may be configured to provide location information (e.g., longitude and latitude) regarding the current location of the WTRU 1402. In addition to, or in lieu of, the information from the GPS chipset 1436, the WTRU 1402 may receive location information over the air interface 1416 from a base station (e.g., base stations 1414*a*, 1414*b*) and/or determine its location based on the timing of the signals being received from two or more nearby base stations. It should be appreciated that the WIRU 1402 may acquire location information by way of any suitable location-determination method while remaining consistent with an embodiment.

The processor 1418 may further be coupled to other peripherals 1438, which may include one or more software and/or hardware modules that provide additional features, functionality and/or wired or wireless connectivity. For example, the peripherals 1438 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 14C:
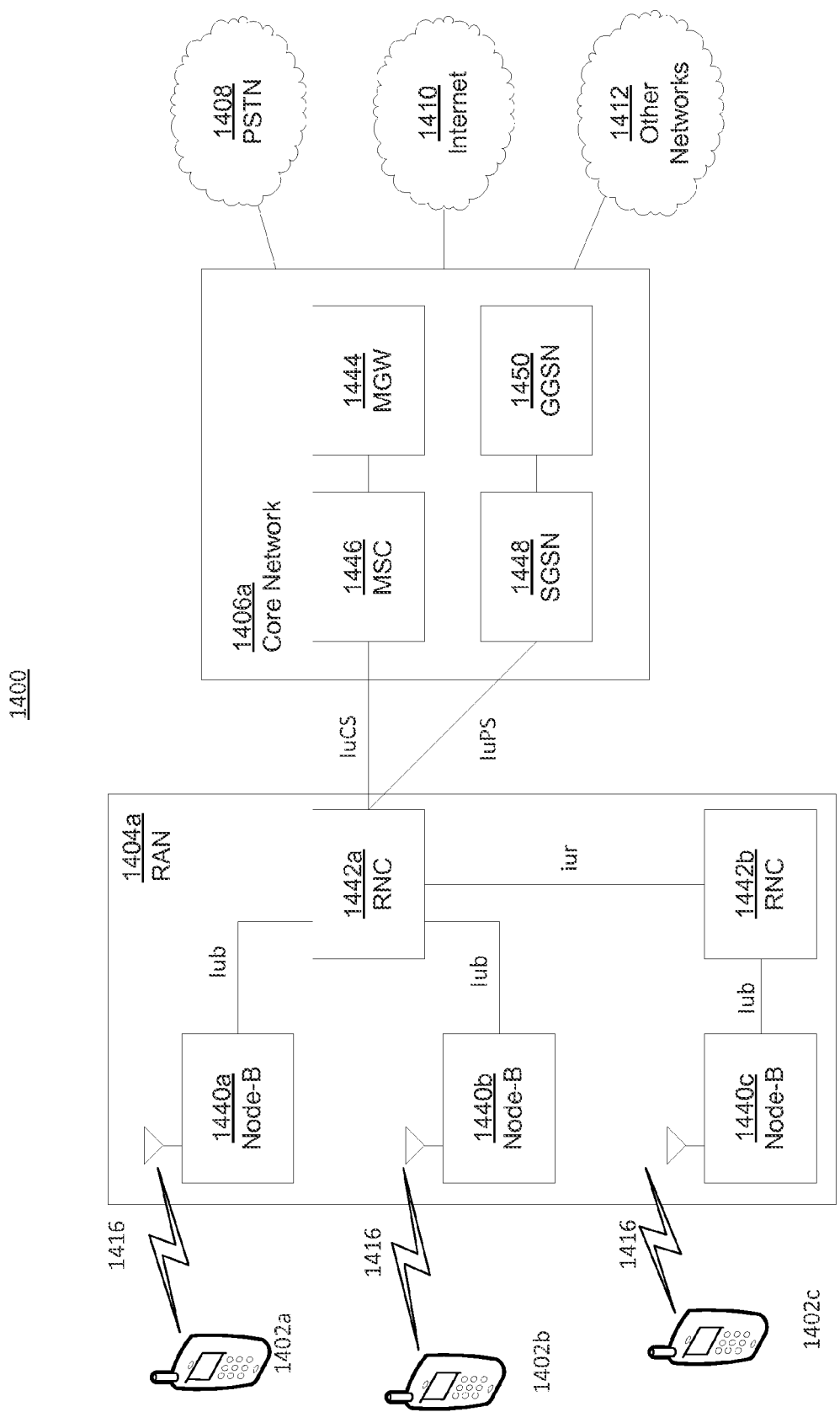
FIG. 14C depicts a system diagram of an example radio access network and an example core network that may be used within the communications system illustrated in FIG. 14A.

FIG. 14C is a system diagram of an embodiment of the communications system 1400 that includes a RAN 1404*a* and a core network 1406*a* that comprise example implementations of the RAN 1404 and the core network 1406, respectively. As noted above, the RAN 1404, for instance the RAN 1404*a*, may employ a UTRA radio technology to communicate with the WTRUs 1402*a*, 1402*b*, and 1402*c* over the air interface 1416. The RAN 1404*a* may also be in communication with the core network 1406*a*. As shown in FIG. 14C, the RAN 1404*a* may include Node-Bs 1440*a*, 1440*b*, 1440*c*, which may each include one or more transceivers for communicating with the WTRU is 1402*a*, 1402*b*, 1402*c* over the air interface 1416. The Node-Bs 1440*a*, 1440*b*, 1440*c* may each be associated with a particular cell (not shown) within the RAN 1404*a*. The RAN 1404*a* may also include RNCs 1442*a*, 1442*b*. It should be appreciated that the RAN 1404*a* may include any number of Node-Bs and RNCs while remaining consistent with an embodiment.

As shown in FIG. 14C, the Node-Bs 1440*a*, 1440*b* may be in communication with the RNC 1442*a*. Additionally, the Node-B 1440*c* may be in communication with the RNC1442*b*. The Node-Bs 1440*a*, 1440*b*, 1440*c* may communicate with the respective RNCs 1442*a*, 1442*b* via an Iub interface. The RNCs 1442*a*, 1442*b* may be in communication with one another via an Iur interface. Each of the RNCs 1442*a*, 1442*b* may be configured to control the respective Node-Bs 1440*a*, 1440*b*, 1440*c* to which it is connected. In addition, each of the RNCs 1442*a*, 1442*b* may be configured to carry out or support other functionality, such as outer loop power control, load control, admission control, packet scheduling, handover control, macrodiversity, security functions, data encryption, and the like.

The core network 1406*a* shown in FIG. 14C may include a media gateway (MGW) 1444, a mobile switching center (MSC) 1446, a serving GPRS support node (SGSN) 1448, and/or a gateway GPRS support node (GGSN) 1450. While each of the foregoing elements is depicted as part of the core network 1406*a*, it should be appreciated that any one of these elements may be owned and/or operated by an entity other than the core network operator.

The RNC 1442*a* in the RAN 1404*a* may be connected to the MSC 1446 in the core network 1406*a* via an IuCS interface. The MSC 1446 may be connected to the MGW 1444. The MSC 1446 and the MGW 1444 may provide the WTRUs 1402*a*, 1402*b*, 1402*c* with access to circuit-switched networks, such as the PSTN 1408, to facilitate communications between the WTRUs 1402*a*, 1402*b*, 1402*c* and traditional land-line communications devices.

The RNC 1442*a* in the RAN 1404*a* may also be connected to the SGSN 1448 in the core network 1406*a* via an IuPS interface. The SGSN 1448 may be connected to the GGSN 1450. The SGSN 1448 and the GGSN 1450 may provide the WTRUs 1402*a*, 1402*b*, 1402*c* with access to packet-switched networks, such as the Internet 1410, to facilitate communications between and the WTRUs 1402*a*, 1402*b*, 1402*c* and IP-enabled devices.

As noted above, the core network 1406*a* may also be connected to the networks 1412, which may include other wired or wireless networks that are owned and/or operated by other service providers.

Figure 14D:
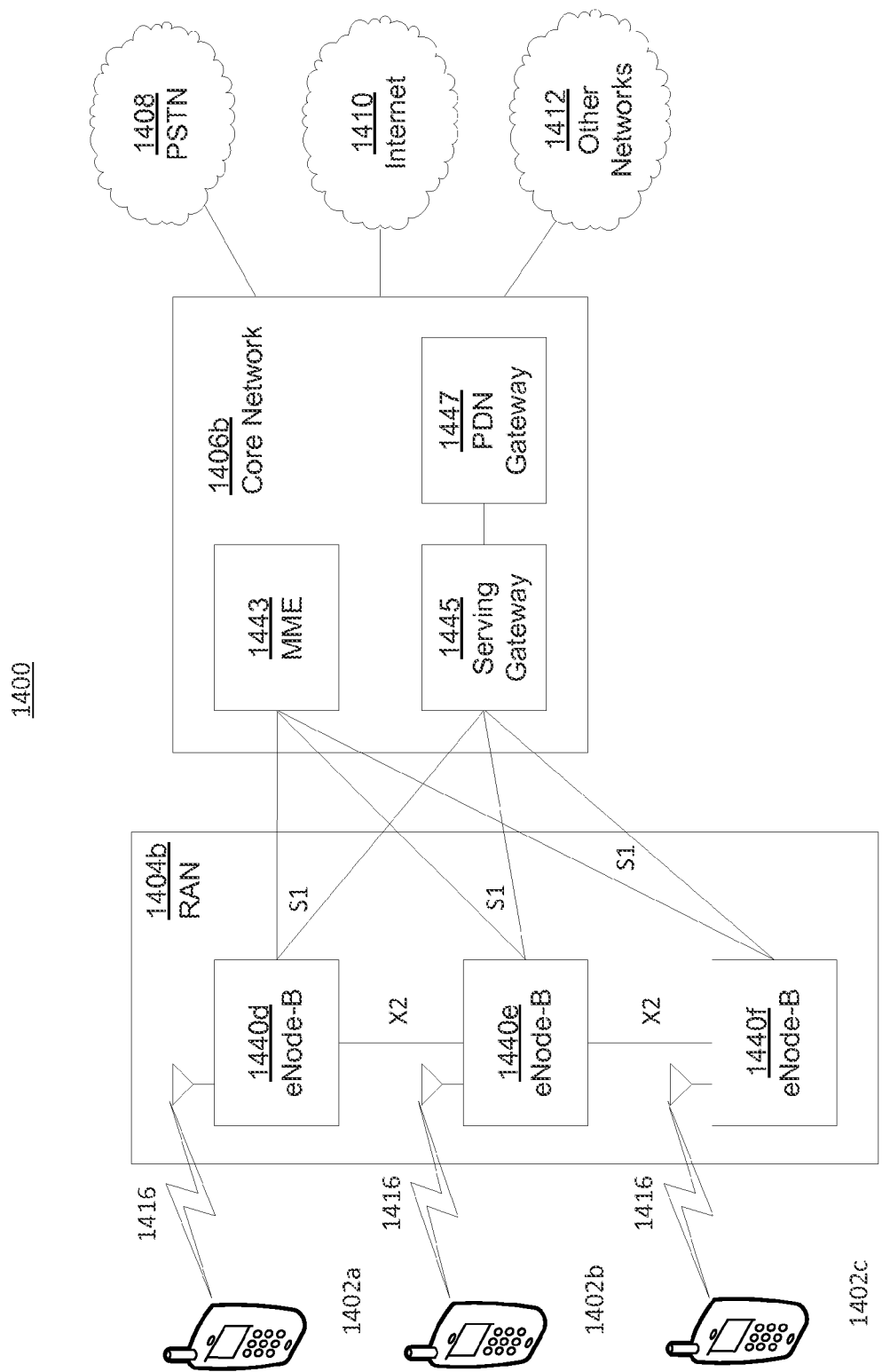
FIG. 14D depicts a system diagram of an example radio access network and an example core network that may be used within the communications system illustrated in FIG. 14A.

FIG. 14D is a system diagram of an embodiment of the communications system 1400 that includes a RAN 1404*b* and a core network 1406*b* that comprise example implementations of the RAN 1404 and the core network 1406, respectively. As noted above, the RAN 1404, for instance the RAN 1404*b*, may employ an E-UTRA radio technology to communicate with the WTRUs 1402*a*, 1402*b*, and 1402*c* over the air interface 1416. The RAN 1404*b* may also be in communication with the core network 1406*b*.

The RAN 1404*b* may include eNode-Bs 1440*d*, 1440*e*, 1440*f*, though it should be appreciated that the RAN 1404*b* may include any number of eNode-Bs while remaining consistent with an embodiment. The eNode-Bs 1440*d*, 1440*e*, 1440*f* may each include one or more transceivers for communicating with the WTRUs 1402*a*, 1402*b*, 1402*c* over the air interface 1416. In one embodiment, the eNode-Bs 1440*d*, 1440*e*, 1440*f* may implement MIMO technology. Thus, the eNode-B 1440*d*, for example, may use multiple antennas to transmit wireless signals to, and receive wireless signals from, the WIRU 1402*a*.

Each of the eNode-Bs 1440*d*, 1440*e*, and 1440*f* may be associated with a particular cell (not shown) and may be configured to handle radio resource management decisions, handover decisions, scheduling of users in the uplink and/or downlink, and the like. As shown in FIG. 14D, the eNode-Bs 1440*d*, 1440*e*, 1440*f* may communicate with one another over an X2 interface.

The core network 1406*b* shown in FIG. 14D may include a mobility management gateway (MME) 1443, a serving gateway 1445, and a packet data network (PDN) gateway 1447. While each of the foregoing elements is depicted as part of the core network 1406*b*, it should be appreciated that any one of these elements may be owned and/or operated by an entity other than the core network operator.

The MME 1443 may be connected to each of the eNode-Bs 1440*d*, 1440*e*, and 1440*f* in the RAN 1404*b* via an S1 interface and may serve as a control node. For example, the MME 1443 may be responsible for authenticating users of the WTRUs 1402*a*, 1402*b*, 1402*c*, bearer activation/deactivation, selecting a particular serving gateway during an initial attach of the WTRUs 1402*a*, 1402*b*, 1402*c*, and the like. The MME 1443 may also provide a control plane function for switching between the RAN 1404*b* and other RANs (not shown) that employ other radio technologies, such as GSM or WCDMA.

The serving gateway 1445 may be connected to each of the eNode Bs 1440*d*, 1440*c*, 1440*f* in the RAN 1404*b* via the S1 interface. The serving gateway 1445 may generally route and forward user data packets to/from the WTRUs 1402*a*, 1402*b*, 1402*c*. The serving gateway 1445 may also perform other functions, such as anchoring user planes during inter-eNode B handovers, triggering paging when downlink data is available for the WTRUs 1402*a*, 1402*b*, 1402*c*, managing and storing contexts of the WTRUs 1402*a*, 1402*b*, 1402*c*, and the like.

The serving gateway 1445 may also be connected to the PDN gateway 1447, which may provide the WTRUs 1402a, 1402b, 1402c with access to packet-switched networks, such as the Internet 1410, to facilitate communications between the WTRUs 1402a, 1402b, 1402c and IP-enabled devices.

The core network 1406b may facilitate communications with other networks. For example, the core network 1406b may provide the WTRUs 1402a, 1402b, 1402c with access to circuit-switched networks, such as the PSTN 1408, to facilitate communications between the WTRUs 1402a, 1402b, 1402c and traditional land-line communications devices. For example, the core network 1406b may include, or may communicate with, an IP gateway (e.g., an IP multimedia subsystem (IMS) server) that serves as an interface between the core network 1406b and the PSTN 1408. In addition, the core network 1406b may provide the WTRUs 1402a, 1402b, 1402c with access to the networks 1412, which may include other wired or wireless networks that are owned and/or operated by other service providers.

Figure 14E:
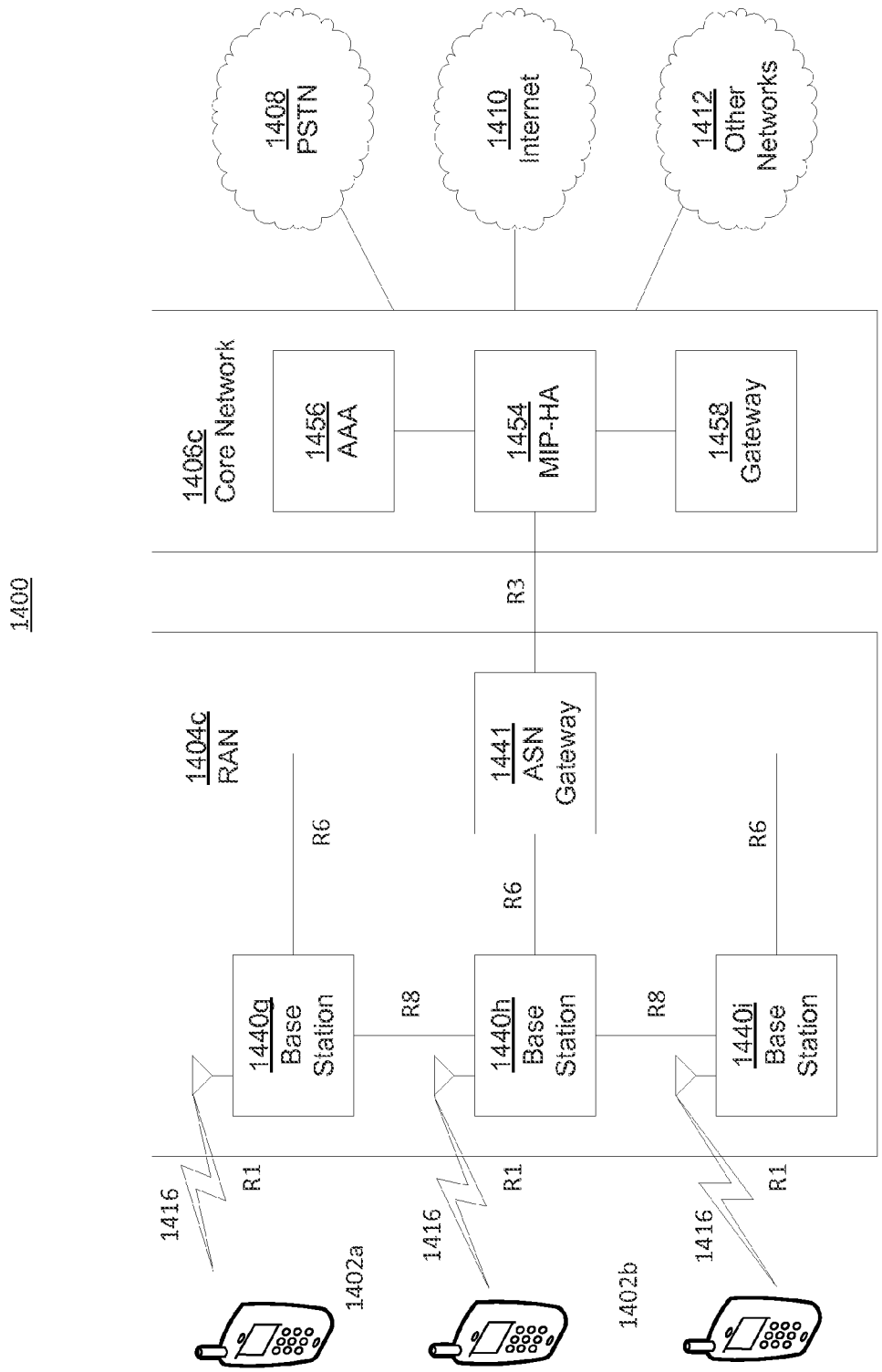
FIG. 14E depicts a system diagram of an example radio access network and an example core network that may be used within the communications system illustrated in FIG. 14A.

FIG. 14E is a system diagram of an embodiment of the communications system 1400 that includes a RAN 1404c and a core network 1406c that comprise example implementations of the RAN 1404 and the core network 1406, respectively. The RAN 1404, for instance the RAN 1404c, may be an access service network (ASN) that employs IEEE 802.16 radio technology to communicate with the WTRUs 1402a, 1402b, and 1402c over the air interface 1416. As described herein, the communication links between the different functional entities of the WTRUs 1402a, 1402b, 1402c, the RAN 1404c, and the core network 1406c may be defined as reference points.

As shown in FIG. 14E, the RAN 1404c may include base stations 1402a, 1402b, 1402c, and an ASN gateway 1441, though it should be appreciated that the RAN 1404c may include any number of base stations and ASN gateways while remaining consistent with an embodiment. The base stations 1402a, 1402b, 1402c may each be associated with a particular cell (not shown) in the RAN 1404c and may each include one or more transceivers for communicating with the WTRUs 1402a, 1402b, 1402c over the air interface 1416. In one embodiment, the base stations 1440g, 1440h, 1440i may implement MIMO technology. Thus, the base station 1440g, for example, may use multiple antennas to transmit wireless signals to, and receive wireless signals from, the WTRU 1402a. The base stations 1440g, 1440h, 1440i may also provide mobility management functions, such as handoff triggering, tunnel establishment, radio resource management, traffic classification, quality of service (QoS) policy enforcement, and the like. The ASN Gateway 1441 may serve as a traffic aggregation point and may be responsible for paging, caching of subscriber profiles, routing to the core network 1406c, and the like.

The air interface 1416 between the WTRUs 1402a, 1402b, 1402c and the RAN 1404c may be defined as an R1 reference point that implements the IEEE 802.16 specification. In addition, each of the WTRUs 1402a, 1402b, and 1402c may establish a logical interface (not shown) with the core network 1406c. The logical interface between the WTRUs 1402a, 1402b, 1402c and the core network 1406c may be defined as an R2 reference point, which may be used for authentication, authorization, IP host configuration management, and/or mobility management.

The communication link between each of the base stations 1440g, 1440h, 1440i may be defined as an R8 reference point that includes protocols for facilitating WTRU handovers and the transfer of data between base stations. The communication link between the base stations 1440g, 1440h, 1440i and the ASN gateway 1441 may be defined as an R6 reference point. The R6 reference point may include protocols for facilitating mobility management based on mobility events associated with each of the WTRUs 1402a, 1402b, 1402c.

As shown in FIG. 14E, the RAN 1404c may be connected to the core network 1406c. The communication link between the RAN 1404c and the core network 1406c may defined as an R3 reference point that includes protocols for facilitating data transfer and mobility management capabilities, for example. The core network 1406c may include a mobile IP home agent (MIP-FIA) 1444, an authentication, authorization, accounting (AAA) server 1456, and a gateway 1458. While each of the foregoing elements is depicted as part of the core network 1406c, it should be appreciated that any one of these elements may be owned and/or operated by an entity other than the core network operator.

The MIP-HA may be responsible for IP address management, and may enable the WTRUs 1402a, 1402b, and 1402c to roam between different ASNs and/or different core networks. The MIP-HA 1454 may provide the WTRUs 1402a, 1402b, 1402c with access to packet-switched networks, such as the Internet 1410, to facilitate communications between the WTRUs 1402a, 1402b, 1402c and IP-enabled devices. The AAA server 1456 may be responsible for user authentication and for supporting user services. The gateway 1458 may facilitate interworking with other networks. For example, the gateway 1458 may provide the WTRUs 1402a, 1402b, 1402c with access to circuit-switched networks, such as the PSTN 1408, to facilitate communications between the WTRUs 1402a, 1402b, 1402c and traditional landline communications devices. In addition, the gateway 1458 may provide the WTRUs 1402a, 1402b, 1402c with access to the networks 1412, which may include other wired or wireless networks that are owned and/or operated by other service providers.

Although not shown in FIG. 14E, it should be appreciated that the RAN 1404c may be connected to other ASNs and the core network 1406c may be connected to other core networks. The communication link between the RAN 1404c the other ASNs may be defined as an R4 reference point, which may include protocols for coordinating the mobility of the WTRUs 1402a, 1402b, 1402c between the RAN 1404c and the other ASNs. The communication link between the core network 1406c and the other core networks may be defined as an R5 reference point, which may include protocols for facilitating interworking between home core networks and visited core networks.

The processes and instrumentalities described herein may apply in any combination, may apply to other wireless technology, and for other services.

A WTRU may refer to an identity of the physical device, or to the user's identity such as subscription related identities, e.g., MSISDN, SIP URI, etc. WTRU may refer to application-based identities, e.g., user names that may be used per application.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, terminal, base station, RNC, or any host computer.

What is claimed:

1. A method of managing a media streaming session, the media streaming session delivering content to a client, the method comprising:
receiving, at a proxy from a server, a portion of the content and a first media presentation description (MPD) relating to the portion of the content;
receiving a request for information associated with the media streaming session based on a change in a rate adaptation in response to a rate of change of a bandwidth available to the client;
determining a second MPD, wherein the second MPD is a subset of the first MPD;
sending the second MPD to the client in response to the request for information associated with the media streaming session;
receiving a request for the portion of the content; and
sending the portion of the content to the client.

2. The method of claim 1, wherein the second MPD indicates a portion of the content available via the proxy.

3. The method of claim 2, wherein the portion of the content is the portion of the content available via the proxy.

4. The method of claim 2, wherein the proxy is an HTTP proxy.

5. The method of claim 2, wherein the second MPD comprises one or more cache control parameters associated with the proxy.

6. The method of claim 1, wherein the request for information associated with the media streaming session is received based on a change in the rate adaptation in response to a change in a parameter associated with the media streaming session, the parameter indicating at least one of whether a proxy cache is used or whether video streaming content is sponsored by advertisements.

7. The method of claim 6, wherein the rate adaptation is changed based on identifying a hypothesis using the changed parameter and at least one other parameter.

8. The method of claim 1, further comprising sending a header indicating an existence of the proxy, the proxy being a Dynamic Adaptive Streaming over HTTP (DASH)-aware proxy.

9. The method of claim 1, wherein the request for the portion of the content comprises a header that indicates a request for streaming content from a Dynamic Adaptive Streaming over HTTP (DASH)-aware proxy.

10. The method of claim 1, further comprising caching the portion of the content.

11. The method of claim 10, wherein the second MPD indicates the cached portion of the content.

12. A proxy comprising:
a transceiver; and
a processor configured to:
receive, from a server, a portion of content and a first media presentation description (MPD) relating to the portion of content;
receive a request for information associated with a streaming session based on a change in a rate adaptation in response to a rate of change of a bandwidth available to a client;
determine a second MPD, wherein the second MPD includes an indication of a portion of content available via the proxy, and wherein the second MPD is a subset of the first MPD;
send the second MPD to the client in response to the request for information;
receive a request for the portion of content; and
send the portion of content to the client.

13. The proxy of claim 12, wherein the portion of content is the portion of content available via the proxy.

14. The proxy of claim 13, wherein the proxy comprises an HTTP proxy.

15. The proxy of claim 13, wherein the second MPD comprises one or more cache control parameters associated with the proxy.

16. The proxy of claim 12, wherein the request for information is received based on a change in the rate adaptation in response to a change in a parameter associated with the streaming session, the parameter indicating at least one of whether a proxy cache is used or whether video streaming content is sponsored by advertisements.

17. The proxy of claim 16, wherein the rate adaptation is changed based on identifying a hypothesis using the changed parameter and at least one other parameter.

18. The proxy of claim 12, wherein the processor is configured to send a header indicating an existence of the proxy, the proxy being a Dynamic Adaptive Streaming over HTTP (DASH)-aware proxy.

19. The proxy of claim 12, wherein the request for the first portion of content comprises a header that indicates a request for streaming content from a Dynamic Adaptive Streaming over HTTP (DASH)-aware proxy.

20. The proxy of claim 12, wherein the processor is configured to cache the portion of the content, the second MPD indicating the cached portion of the content.

* * * * *